(12) United States Patent
Helmrich

(10) Patent No.: US 11,843,805 B2
(45) Date of Patent: Dec. 12, 2023

(54) DEBLOCKING OR DERINGING FILTER AND ENCODER, DECODER AND METHOD FOR APPLYING AND VARYING A STRENGTH OF A DEBLOCKING OR DERINGING FILTER

(71) Applicant: Fraunhofer-Gesellschaft zur Foerderung der angewandten Forschung e.V., Munich (DE)

(72) Inventor: Christian Helmrich, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 57 days.

(21) Appl. No.: 17/212,796

(22) Filed: Mar. 25, 2021

(65) Prior Publication Data

US 2021/0211737 A1    Jul. 8, 2021

Related U.S. Application Data

(63) Continuation of application No. PCT/EP2019/076080, filed on Sep. 26, 2019.

(30) Foreign Application Priority Data

Sep. 28, 2018  (EP) .................................. 18197609
Oct. 19, 2018  (EP) .................................. 18201517

(51) Int. Cl.
*H04N 19/82*    (2014.01)
*H04N 19/117*   (2014.01)
(Continued)

(52) U.S. Cl.
CPC ........... *H04N 19/82* (2014.11); *H04N 19/117* (2014.11); *H04N 19/172* (2014.11); *H04N 19/176* (2014.11); *H04N 19/52* (2014.11)

(58) Field of Classification Search
CPC ...... H04N 19/80; H04N 19/82; H04N 19/117; H04N 19/85
See application file for complete search history.

(56) References Cited

U.S. PATENT DOCUMENTS

| 2003/0219073 A1 | 11/2003 | Lee et al. |
| 2007/0217508 A1 | 9/2007 | Shimada et al. |

(Continued)

FOREIGN PATENT DOCUMENTS

| CN | 105409221 A | 3/2016 |
| CN | 106464866 A | 2/2017 |

(Continued)

OTHER PUBLICATIONS

M. Fu et al. "Sample Adaptive Offset in the HEVC Standard," IEEE Trans. CSVT, vol. 22, 2012 (https://ieeexplore.ieee.org/document/6324411).

(Continued)

*Primary Examiner* — Kyle M Lotfi
(74) *Attorney, Agent, or Firm* — Perkins Coie LLP; Michael A. Glenn

(57) ABSTRACT

Provided are an encoder, a decoder and methods for applying and varying a strength of a deblocking or deringing filter for filtering a block of a picture, wherein the deblocking filter is configured to determine, for each of at least eight border portions of a border of the block, a dissimilarity between an unfiltered content of the block and a surrounding picture content around the block along the respective border portion, the eight border portions including four corner border portions, each arranged at a corner of the block, and four edge border portions, each arranged at intermediary portions of the border between the corners of the block. Furthermore, the deblocking filter is configured to parametrize a deblocking filtering of the block using the dissimi- (Continued)

larities determined for the at least eight border portions in order to obtain a filtered content of the block.

27 Claims, 20 Drawing Sheets

(51) Int. Cl.
*H04N 19/172* (2014.01)
*H04N 19/176* (2014.01)
*H04N 19/52* (2014.01)

(56) References Cited

U.S. PATENT DOCUMENTS

| | | |
|---|---|---|
| 2009/0034855 A1 | 2/2009 | Chuang |
| 2009/0141814 A1* | 6/2009 | Yin ................ H04N 19/61 375/E7.193 |
| 2015/0365666 A1 | 12/2015 | Dong et al. |
| 2017/0054976 A1 | 2/2017 | Li et al. |
| 2017/0127090 A1 | 5/2017 | Rosewarne et al. |
| 2018/0131969 A1* | 5/2018 | Huang ................ H04N 19/137 |
| 2018/0176601 A1 | 6/2018 | Jeong et al. |

FOREIGN PATENT DOCUMENTS

| | | |
|---|---|---|
| CN | 107925773 A | 4/2018 |
| JP | 2000059769 A | 2/2000 |
| JP | 2011223302 A | 11/2011 |
| JP | 2014535238 A | 12/2014 |
| WO | 2011127961 A1 | 10/2011 |
| WO | 2012096614 A2 | 7/2012 |
| WO | 2014043516 A1 | 3/2014 |
| WO | 2018024425 A1 | 2/2018 |

OTHER PUBLICATIONS

Norkin et al.: "HEVC Deblocking Filter," IEEE Trans. Circ. Syst. Video Tech. (CSVT), vol. 22, 2012 (https://ieeexplore.ieee.org/document/6324414).

Helmrich (Fraunhofer) C. et al.; CE11-related: Very strong deblocking filtering with conditional activation signaling, 12. JVET Meeting; Oct. 3, 2018-Oct. 12, 2018; MACAO; (The Joint Video Exploration Team of ISO/IEC JTC1/SC29/WG11 and ITU-T SG.16). No. JVET-L0523 Oct. 7, 2018 (Oct. 7, 2018), XP030195248.

* cited by examiner

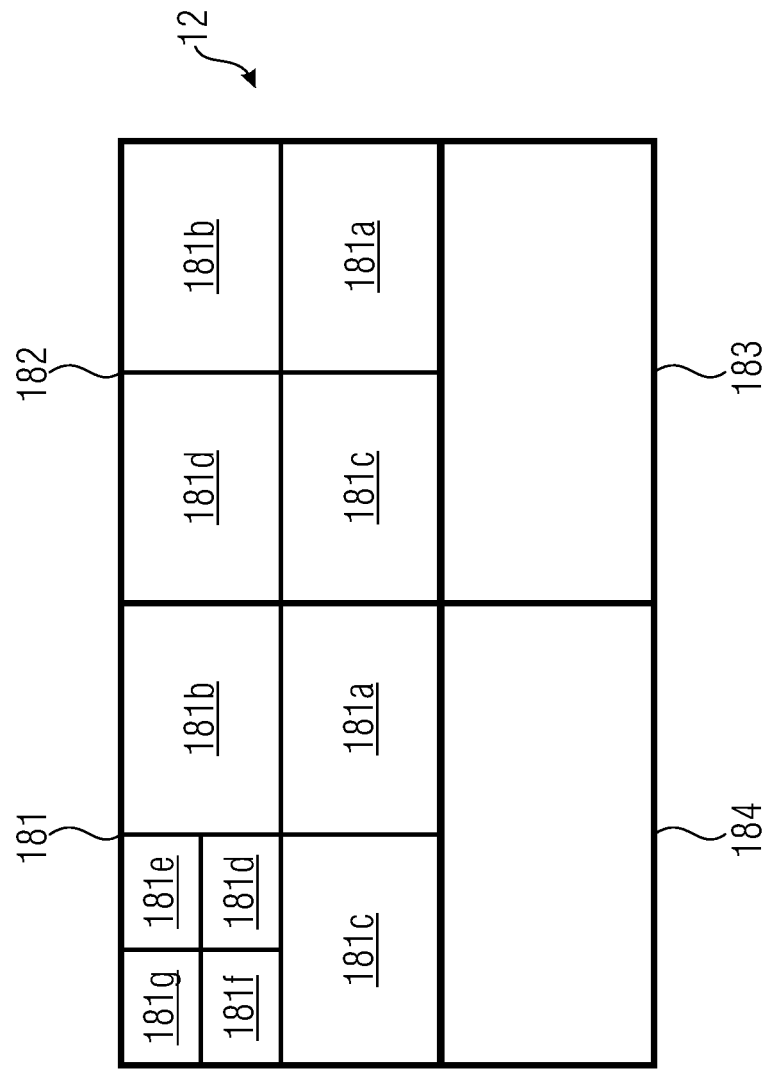

Determining, for each of at least eight border portions of a border of the block, a dissimilarity between an unfiltered content of the block and a surrounding picture content around the block along the respective border portion, the eight border portions including four corner border portions, each arranged at a corner of the block, and four edge border portions, each arranged at intermediary portions of the border between the corners of the block ~1901

Parametrizing a deblocking filtering of the block using the dissimilarities determined for the at least eight border portions in order to obtain a filtered content of the block ~1902

Fig. 19

DEBLOCKING OR DERINGING FILTER AND ENCODER, DECODER AND METHOD FOR APPLYING AND VARYING A STRENGTH OF A DEBLOCKING OR DERINGING FILTER

CROSS-REFERENCES TO RELATED APPLICATIONS

This application is a continuation of copending International Application No. PCT/EP2019/076080, filed Sep. 26, 2019, which is incorporated herein by reference in its entirety, and additionally claims priority from European Applications Nos. EP 18 1976 09.3, filed Sep. 28, 2018 and EP 18 201 517.2, filed Oct. 19, 2018, all of which are incorporated herein by reference in their entirety.

Embodiments of the present invention relate to a deblocking or deringing filter as well as to an encoder, a decoder and respective methods for block-based encoding and decoding picture data using a deblocking or a deringing filter, wherein the strength of said deblocking or deringing filter may be varied depending on one or more conditions. Some embodiments may particularly concern a selective signaling of a respective filter control parameter.

BACKGROUND OF THE INVENTION

Contemporary perceptual (i.e., lossy) block transform image and video codecs (coders/decoders) can reach very good visual reconstruction quality even at relatively low bit-rates. At very low bitrates, however, artifacts such as blurring and discontinuities around the block boundaries, often referred to as "blocking", appear. To mitigate these typically annoying artifacts, deblocking postprocessing algorithms are utilized in modern codecs such as H.265/HEVC, H.266/VVC, and AV1.

In video coding, a typical deblocking post-processor operates as an in-loop filter on each decoded image or frame, i.e., on each inter-picture prediction (also known as motion compensation) source image/frame before coding of the next image/frame in the encoding loop. The deblocking postfilter analyzes the boundary pixel values of each reconstructed sub-block of the decoded image in terms of potential discontinuities. If a weak discontinuity is found, it is assumed to be caused by the low-rate coding itself and not to be part of the original image and, thus, this discontinuity is reduced by way of smoothing of the pixel values (e. g., the addition of adaptive pixel value offsets).

A similar in-loop filter is the Sample Adaptive Offset (SAO) method used in HEVC, which classifies the decoded pixels per (sub-)block based on their values and determines additive offsets for each pixel class. These additive offsets are then signaled to, and applied in, the decoder per (sub-) block. In doing so, the SAO filter act as a deringing filter.

Details on the HEVC deblocking filter are given in https://ieeexplore.ieee.org/document/6324414, A. Norkin et al., "HEVC Deblocking Filter," IEEE Trans. Circ. Syst. Video Tech. (CSVT), vol. 22, 2012, an overview of the SAO in-loop filter is provided in https://ieeexplore.ieee.org/document/6324411, C. M. Fu et al., "Sample Adaptive Offset in the HEVC Standard," IEEE Trans. CSVT, vol. 22, 2012.

In H.266/VVC, the maximum transform block size has doubled compared to the size allowed in HEVC, which was found to involve the use of stronger deblocking filters (i.e., deblocking postprocessors modifying a wider range of pixels) especially around the large-block boundaries. Such more aggressive deblocking filters, however, increase the risk of smoothing out—and, thus, potentially erasing—original image content which was not caused by the low-rate coding.

It is, therefore, concluded that very strong deblocking filtering is desirable for some low-rate coded high-resolution image and video content and that it is essential to allow for highly selective control of the application of said strong deblocking filtering. Naturally, a bit-flag may be signaled for each sub-block (e.g., each coding tree unit, CTU) to indicate to the receiver (i.e., decoder) whether to allow the application of the strong deblocking filter. This approach, however, would lead to many additional signaling bits being included in the bit-stream, thereby increasing the coding bit-rate to an unacceptable level especially at very low bit-rates.

Thus, a more efficient solution may be useful. Accordingly, it is an object of the present invention to improve existing artefact-filtering and to provide an efficient signaling of varying filtering strengths without the drawbacks mentioned above.

SUMMARY

According to an embodiment, a decoder for block-based decoding of picture data using a deblocking or deringing filter is configured to: reconstruct, in a blockwise manner, a picture from a data stream using prediction and using a prediction residual coded in the data stream to acquire a reconstructed version of the picture, apply the deblocking or deringing filter to the reconstructed version of the picture, and locally vary a strength of the deblocking or deringing filter depending on a first measure locally measuring a mean block size, and a second measure locally measuring a frequency of non-zero coding of the prediction residual.

According to another embodiment, an encoder for block-based encoding of picture data using a deblocking or deringing filter as an in-loop filter is configured to: encode, in a blockwise manner, a picture into a data stream using prediction and by coding a prediction residual into the data stream with providing a reconstructed version of the picture in a prediction loop of the encoder, apply the deblocking or deringing filter onto the reconstructed version of the picture, and locally vary a strength of the deblocking or deringing filter depending on a first measure locally measuring a mean block size, and a second measure locally measuring a frequency of non-zero coding of the prediction residual.

According to another embodiment, a method for block-based decoding of picture data using a deblocking or deringing filter may have the steps of: reconstructing, in a blockwise manner, a picture from a data stream using prediction and using a prediction residual coded in the data stream to acquire a reconstructed version of the picture, applying the deblocking or deringing filter to the reconstructed version of the picture, and locally varying a strength of the deblocking or deringing filter depending on a first measure locally measuring a mean block size, and a second measure locally measuring a frequency of non-zero coding of the prediction residual.

According to another embodiment, a method for block-based encoding of picture data using a deblocking or deringing filter as an in-loop filter may have the steps of: encoding, in a blockwise manner, a picture into a data stream using prediction and coding a prediction residual into the data stream with providing a reconstructed version of the picture in a prediction loop, applying the deblocking or deringing filter onto the reconstructed version of the picture, and locally varying a strength of the deblocking or deringing filter depending on a first measure locally measuring a mean block size, and a second measure locally measuring a frequency of non-zero coding of the prediction residual.

Another embodiment may have a non-transitory digital storage medium having a computer program stored thereon to perform the method for block-based decoding of picture data using a deblocking or deringing filter, the method having the steps of: reconstructing, in a blockwise manner, a picture from a data stream using prediction and using a prediction residual coded in the data stream to acquire a reconstructed version of the picture, applying the deblocking or deringing filter to the reconstructed version of the picture, and locally varying a strength of the deblocking or deringing filter depending on a first measure locally measuring a mean block size, and a second measure locally measuring a frequency of non-zero coding of the prediction residual, when said computer program is run by a computer.

Another embodiment may have a non-transitory digital storage medium having a computer program stored thereon to perform the method for block-based encoding of picture data using a deblocking or deringing filter as an in-loop filter, the method comprising the steps of: encoding, in a blockwise manner, a picture into a data stream using prediction and coding a prediction residual into the data stream with providing a reconstructed version of the picture in a prediction loop, applying the deblocking or deringing filter onto the reconstructed version of the picture, and locally varying a strength of the deblocking or deringing filter depending on a first measure locally measuring a mean block size, and a second measure locally measuring a frequency of non-zero coding of the prediction residual, when said computer program is run by a computer.

Another embodiment may have a data stream acquired by an inventive method or a method for block-based encoding of picture data using a deblocking or deringing filter as an in-loop filter, the method having the steps of: encoding, in a blockwise manner, a picture into a data stream using prediction and coding a prediction residual into the data stream with providing a reconstructed version of the picture in a prediction loop, applying the deblocking or deringing filter onto the reconstructed version of the picture, and locally varying a strength of the deblocking or deringing filter depending on a first measure locally measuring a mean block size, and a second measure locally measuring a frequency of non-zero coding of the prediction residual.

According to a first aspect of the invention, this problem is solved with a decoder having the features of claim 1, an encoder having the features of claim 14, a method for decoding according to claim 26, a method for encoding according to claim 27, a computer readable digital storage medium according to claim 28 and a data stream according to claim 29.

According to a second aspect of the invention, this problem is solved with a deblocking filter having the features of claim 30, a decoder having the features of claim 48, an encoder having the features of claim 50, a method for deblocking according to claim 52, a computer readable digital storage medium according to claim 53 and a data stream according to claim 54.

The inventive decoder of the first aspect is configured for block-based decoding of picture data using a deblocking or deringing filter. The decoder is configured to reconstruct, in a blockwise manner, a picture from a data stream using prediction and using a prediction residual coded in the data stream to obtain a reconstructed version of the picture. Predictive coding may, for instance, be executed by means of a spatial intra-picture prediction and/or by means of a temporal inter-picture prediction. Intra-picture prediction may be applied to still images and moving images, while inter-picture prediction may only be applied to moving images. For images with low visual activity, e.g. with few image details, the prediction typically works very efficiently. As a result, the corresponding prediction residuals may comprise very little signal energy and may therefore often be fully quantized to zero. In doing so, these zero-coded prediction residuals can be exempt from transmission. For images with higher visual activity, e.g. with more image details, the prediction may typically exhibit relatively high signal variance in its prediction residual, thus requiring a transmission of at least one (coarsely) quantized prediction residual which is not fully zero. This may also be referred to as non-zero coding of the respective prediction residual. Said non-zero coded prediction residuals may be candidates for causing visible blocking or deringing in the reconstructed (i.e. decoded) version of the picture. Thus, the decoder is configured to apply the deblocking or deringing filter to the reconstructed version of the picture. In this regard, the inventive decoder is furthermore configured to locally vary a strength of the deblocking or deringing filter. In other words, the decoder may control the amount of the deblocking or deringing that is applied to the decoded picture. This may result in an improved image quality over conventional deblocking or deringing filters without said control. Said strength of the deblocking or deringing filter may be quantitively measured. Strength measures may, for instance, be a width of a block's circumferential portions which are affected by the filter, or differently speaking a measure for a reach up to which the filter causes filtering from the block border of the blocks, wherein the larger the strength, the larger the width. Additionally or alternatively, a mean energy of a difference between the filtered version and the unfiltered version of the reconstructed picture to which the filter is applied may be used to measure the filter strength, wherein the larger the strength, the larger the mean energy. The inventive decoder may selectively decide whether to apply said filter control, i.e. whether to vary the filter strength or not, depending on a pre-selection of candidate pictures or candidate picture areas (e.g. blocks), respectively. Said candidate pictures or candidate picture areas (e.g. blocks) may be selected depending on a first measure locally measuring a mean block size, and a second measure locally measuring a frequency of non-zero coding of the prediction residual. The frequency of non-zero coding is meant to describe how often a non-zero coding of a prediction residual in the respective picture or picture area (e.g. block) was applied. In other words, depending on the number of non-zero coded prediction residuals and depending on the mean block size (e.g. a number of blocks or sub-blocks) the decoder may vary the filter strength of the deblocking or deringing filter.

The inventive encoder of the first aspect is configured for block-based encoding of picture data using a deblocking or deringing filter as an in-loop filter. The encoder is configured to encode, in a blockwise manner, a picture into a data stream using prediction and to encode a prediction residual into the data stream with providing a reconstructed version of the picture in a prediction loop of the encoder. The encoder is further configured to apply the deblocking or deringing filter onto the reconstructed version of the picture, and to locally vary a strength of the deblocking or deringing filter depending on a first measure locally measuring a mean block size, and a second measure locally measuring a frequency of non-zero coding of the prediction residual. In other words, the encoder may compute an optimum block-based partitioning of the picture in a rate-distortion loop.

Based on this computation, the encoder may select a candidate picture or a candidate picture area (e.g. block), respectively, based on the mean block size and the number of non-zero coded prediction residuals. These selected candidate pictures or candidate picture areas (e.g. blocks) may then be subject to the varying filter strength. In other words, if a candidate picture or candidate picture area (e.g. block) was selected by the encoder, it may apply the deblocking or deringing filter with varying filter strength to said selected candidate picture or candidate picture area (e.g. block), i.e. the quantity of deblocking or deringing may be selectively controlled by the encoder and, thus, the quality of picture coding may be improved compared to conventional encoders.

According to a second aspect of the invention, a deblocking filter is suggested, wherein said deblocking filter is configured to filter a block of a picture in order to reduce blocking or ringing artefacts. Accordingly, the deblocking filter may also be referred to as a deringing filter. The deblocking filter according to the second aspect may be combined with the encoder and/or the decoder and/or the methods according to the first aspect. Alternatively, the deblocking filter according to the second aspect may be combined with encoders and/or decoders and/or methods being different from the first aspect.

The deblocking filter according to the second aspect may be configured to filter a block of a picture that is processed in a block-based manner. Said filtering may be exploited for reducing blocking or ringing artefacts which may appear upon block-based coding of the picture. The picture may be partitioned into several blocks and subblocks. The deblocking filter may be applied to one or more of said blocks and subblocks for reducing blocking or ringing artefacts upon coding of the picture. Each block may have a block border, which may correspond to the outer circumferential borderline of said block. The blocks may be square or generally rectangular, depending on the applied partitioning scheme. Accordingly, also the border of each block may be square or rectangular, respectively. The border may comprise several portions, for example, portions extending along an edge (also referred to as edge border portions) and portions extending around a corner (also referred to as corner border portions). If a picture is partitioned into a plurality of blocks, said blocks may be contiguously arranged, i.e. the blocks may abut each other. Accordingly, a first block may be surrounded by one or more other blocks. The content (e.g. pixels contained in a block) of neighboring blocks may differ from each other, for instance if there is a transition from a dark picture region into a light picture region. Accordingly, there may be a dissimilarity between a picture content contained inside a first block and a picture content contained outside said first block. Said picture content outside the first block may be contained inside a surrounding second block and may therefore also be referred to as a surrounding picture content. The dissimilarities may represent a difference between the picture content contained inside the first block and the surrounding picture content contained outside the first block. Said dissimilarities may also be referred to as an offset between the picture content contained inside the first block and the surrounding picture content contained outside the first block. The higher the dissimilarities the higher the magnitude of the offset value. The dissimilarities may cause blocking or ringing artefacts upon coding the picture. Thus, they have to be smoothened, which may also be referred to as deblocking or deringing, which may be performed by the inventive deblocking filter. Therefore, the inventive deblocking filter may be configured to determine, for each of at least eight border portions of a border of the block, a dissimilarity between an unfiltered content of the block and a surrounding picture content around the block across the respective border portion. Said at least eight border portions include four corner border portions, each arranged at a corner of the block, and four edge border portions, each arranged at intermediary portions of the border between the corners of the block. The deblocking filter may perform a deblocking filtering using different filter characteristics depending on the current picture content, i.e. depending on the aforementioned dissimilarities. Said different filter characteristics may be adjusted by means of adjustable parameters, which may depend on the current picture dissimilarities. Accordingly, the inventive deblocking filter may be configured to parametrize a deblocking filtering process of the block using the dissimilarities determined for the at least eight border portions in order to obtain a filtered content of the block.

BRIEF DESCRIPTION OF THE DRAWINGS

Embodiments of the present invention will be detailed subsequently referring to the appended drawings, in which:

FIG. 5 shows a schematic view of a picture being pre-partitioned into blocks and being sub-partitioned into subblocks, FIG. 19 shows a schematic block diagram of a method for filtering a block 1000 of a block-based coded picture 12 by applying a deblocking filter according to an embodiment.

DETAILED DESCRIPTION OF THE INVENTION

Figure 1:
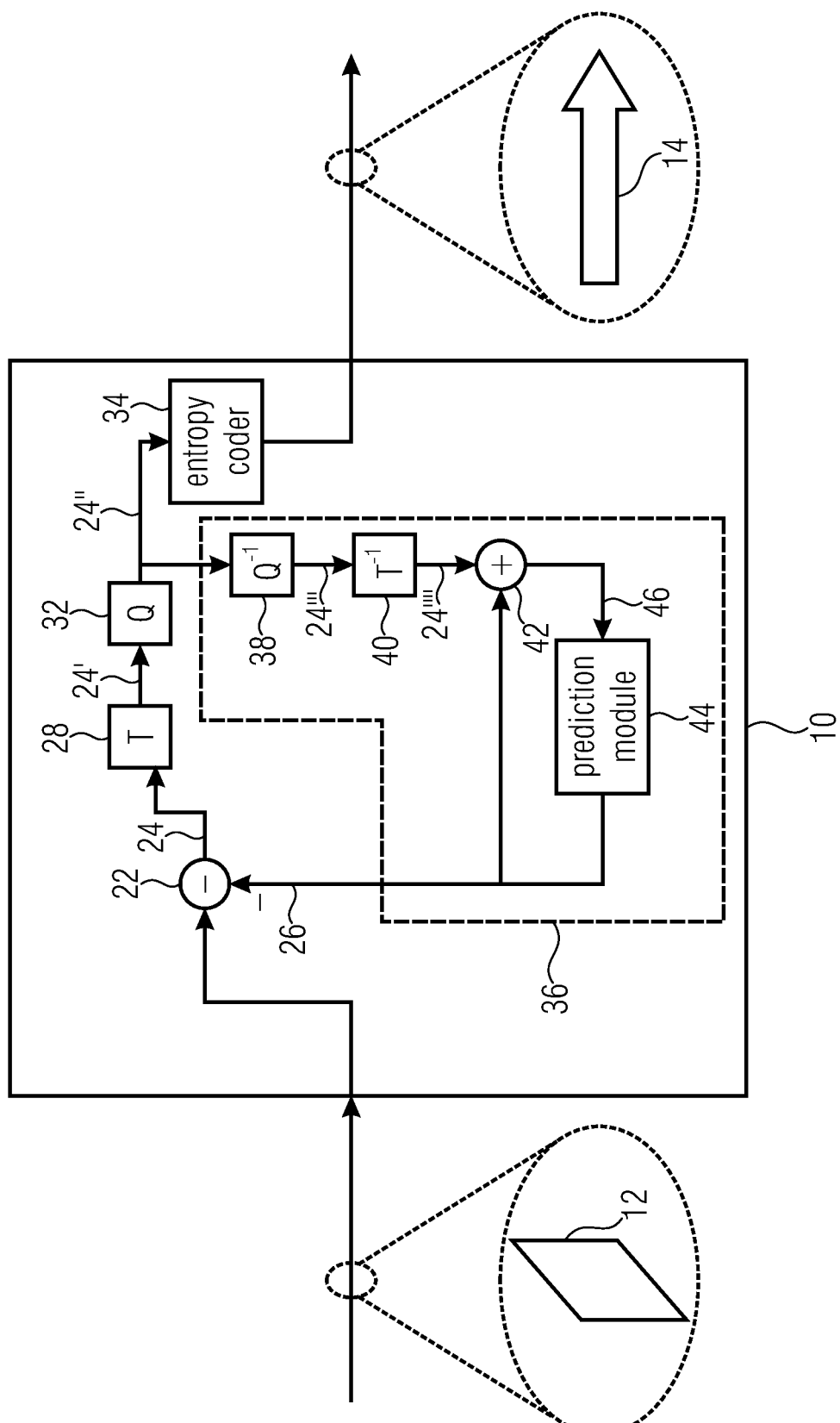
FIG. 1 shows a schematic block diagram of an apparatus for predictively coding a picture as an example for an encoder where an intra prediction concept according to embodiments of the present application could be implemented.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

In this document, the first aspect of the invention will first be described with reference to FIGS. 1 to 9. Afterwards, the second aspect of the invention will be described subsequently with reference to FIGS. 10 to 19.

Introduction to Block-Based Coding

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
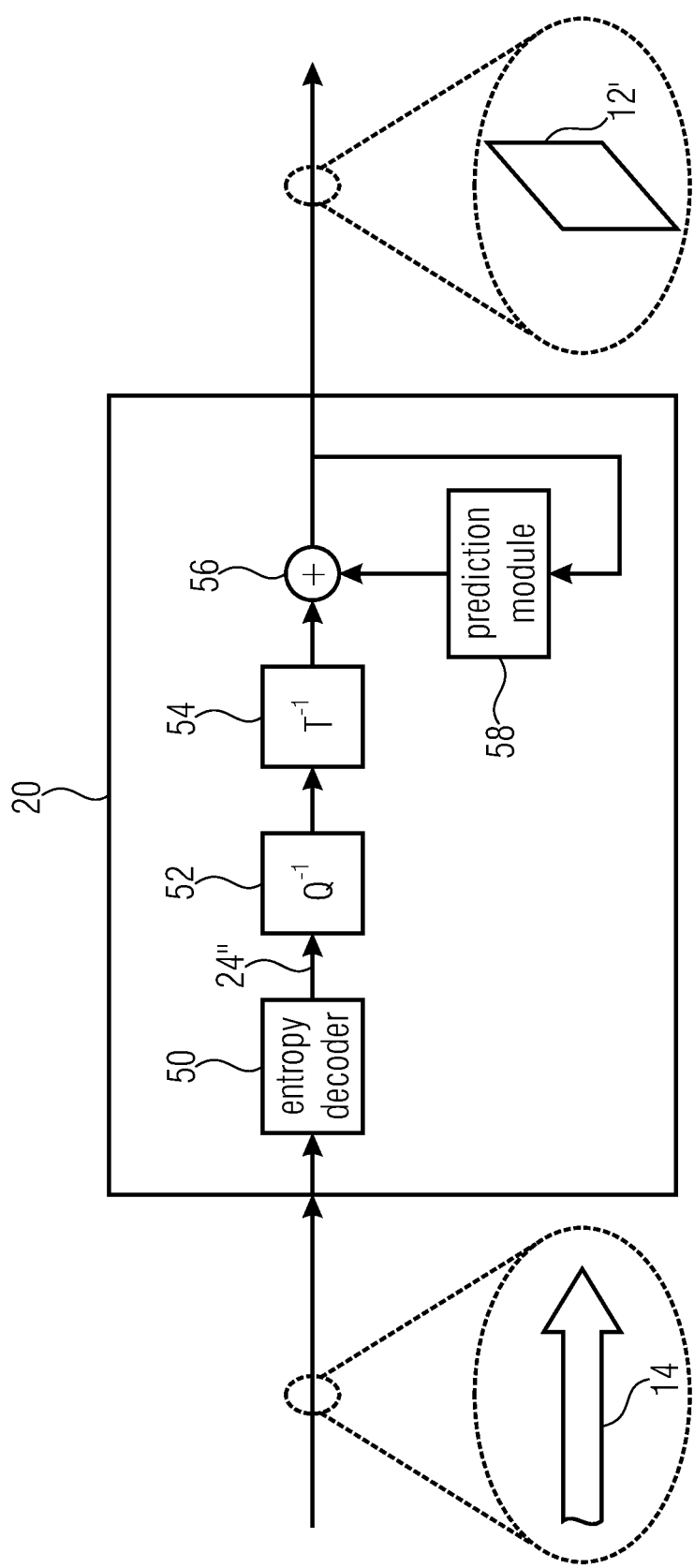
FIG. 2 shows a schematic block diagram of an apparatus for predictively decoding a picture, which fits to the apparatus of FIG. 1, as an example for a decoder where an intra prediction concept according to embodiments of the present application could be implemented.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
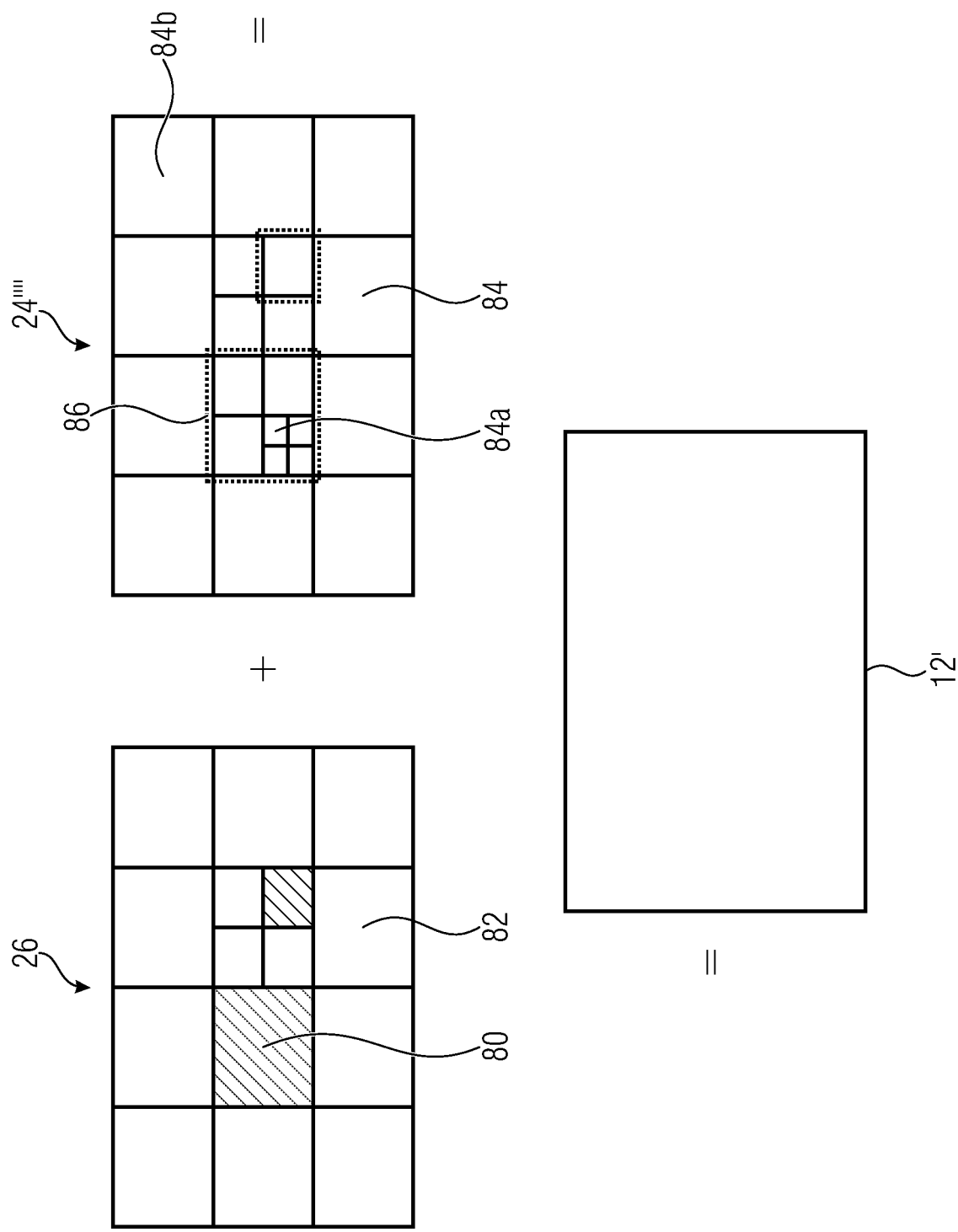
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24'' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

First Aspect

Figure 4:
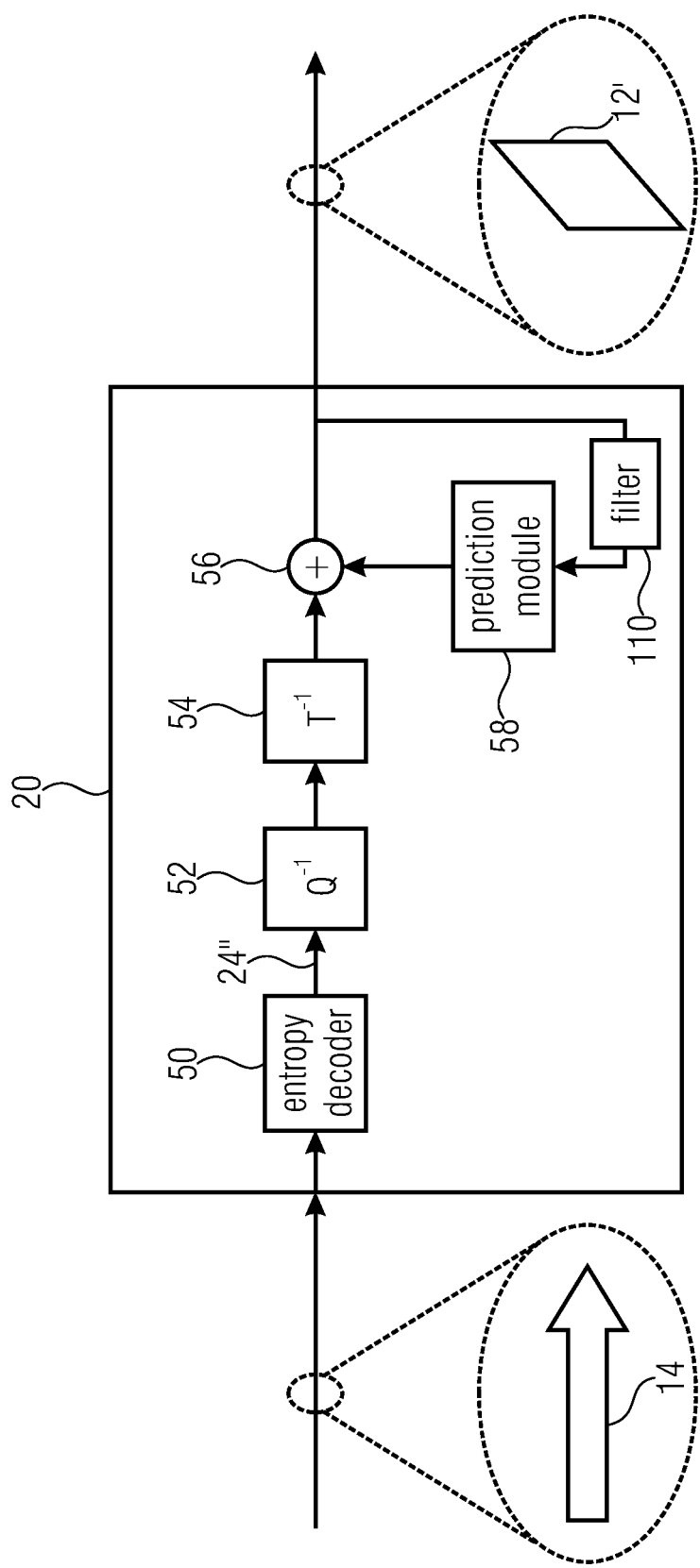
FIG. 4 shows a schematic block diagram of a decoder according to an embodiment.

FIG. 4 shows a decoder 20 according to an exemplary embodiment of the present application according to the first aspect of the invention. The decoder 20 may use the above described concept of block based decoding of picture data, i.e. of a still picture or a moving picture 12'.

The decoder 20 as depicted in FIG. 4 may comprise a similar internal structure as the one described above with reference to FIG. 2. Thus, equal or equivalent elements or elements with equal or equivalent functionality are denoted in FIGS. 2 and 4 by equal or equivalent reference numerals. However, the decoder 20 of FIG. 4 may differ from the decoder of FIG. 2 in that it may additionally comprise a deblocking or deringing filter 110 for filtering and attenuating blocking and/or ringing artefacts, wherein blocking may be regarded as a particular case of a ringing artefact.

As described above, the reconstructed version of the picture, i.e. the decoded picture 12' may be obtained by combining the residual signal 26 and the prediction residual 24" in the combiner 56. The decoder 20 of FIG. 4 may additionally apply the deblocking or deringing filter 110 to the reconstructed version of the picture, i.e. to the decoded picture 12', upon combination of the residual signal 26 and the prediction residual 24".

According to the inventive principle, the decoder 20 may locally vary a strength of the deblocking or deringing filter 110. In other words, the decoder 20 may decide about the filter strength that shall be applied to the decoded picture 12', e.g. whether a weak or a strong deblocking or deringing filter function shall be applied, or even if a deblocking or deringing filter shall be applied at all.

This decision about the applicable filter strength of the deblocking or deringing filter 110 may be based on a first and a second measure. The first measure may represent a locally measured mean block size. The second measure may represent a frequency of non-zero coding of the prediction residual 24", i.e. the number of non-zero coded prediction residuals 24".

The decoder 20 may determine the variable filter strength on a block-wise basis. Therefore, the decoder 20 may be configured to partition the picture 12 into blocks and to perform the reconstruction of the picture 12 by using said blocks, similar as described above with reference to FIG. 3.

FIG. 5 shows an example, wherein the picture 12 may be partitioned into one or more blocks 181, 182, 183, 184. These blocks 181, 182, 183, 184 may also be referred to as coding blocks. The decoder 20 may perform the reconstruction of the picture 12, i.e. the decoding of the picture 12, by using said coding blocks 181, 182, 183, 184.

Furthermore, the coding blocks 181, 182, 183, 184 may be subject to sub-partitioning into one or more sub-blocks 181a-181g and 182a-182d, respectively. The term "blocks" in general as used herein may accordingly refer to coding blocks 181, 182, 183, 184 and/or to sub-blocks 181a-181g, 182a-182d. The above mentioned first measure may be designed to locally measure the size of the blocks. Accordingly, the size of the blocks may, for instance, be measured in terms of coding blocks 181, 182, 183, 184 and/or in terms of sub-blocks 181a-181g, 182a-182d.

The partitioning mode for partitioning the coding blocks 181, 182, 183, 184 into one or more sub-blocks 181a-181g, 182a-182d may be signaled in the data stream 14 by means of a coding tree, which may also be referred to as a partitioning tree or a split tree. A tree root block, which may correspond to a coding block 181, 182, 183, 184, may be split into one or more leaf blocks, which may correspond to the sub-blocks 181a-181g and 182a-182d.

Accordingly, as exemplarily depicted in FIG. 5, the decoder 20 may be configured to perform the partitioning of the picture 12 into blocks by subjecting each of the plurality of tree root blocks 181, 182, 183, 184 to a recursive multi-tree sub-divisioning so that the blocks form leaf blocks 181a-181g, 182a-182d of the plurality of tree root blocks 181, 182, 183, 184. The decoder 20 may determine the first measure and the second measure locally for each tree root block 181, 182, 183, 184.

For example, in HEVC the coding blocks 181, 182, 183, 184 may also be referred to as Coding Tree Units (CTU), and the sub-blocks 181a-181g, 182a-182d may also be referred to as Coding Units (CU). A non-limiting exemplary embodiment shall be described in the following using the HEVC standard. However, the principle of the present application is not restricted to the HEVC standard.

Let us assume a usage of the principle of this application in an image or video codec defining a block size of L×L as the largest possible coding block size. Such a coding block 181, 182, 183, 184, also called CTU above, can be subject to sub-partitioning into multiple square or rectangular sub-blocks 181a-181g, 182a-182d, each of size M×N pixel units.

Examples are depicted in FIGS. 6A-6F which show, as non-limiting examples, several possibilities of partitioning a coding block 181.

Figure 6A:
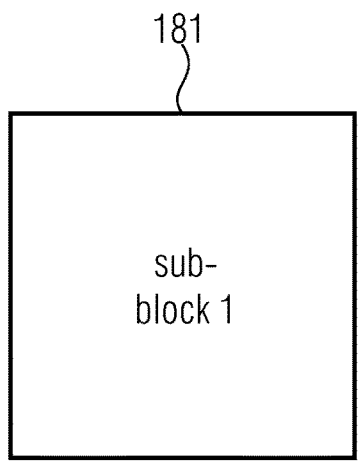
FIGS. 6A-6F show schematic views of a picture being partitioned into blocks using different multi-tree sub-divisioning schemes.

For example, FIG. 6A shows an example in which the coding block 181 is not further partitioned into sub-blocks. Accordingly, coding block 181 may only comprise one single sub-block (sub-block 1) and may, thus, be the same as sub-block 1. FIG. 6A therefore implies the absence of sub-partitioning.

Some further examples for CTU segmentations, including rectangular sub-blocks, are shown in FIGS. 6B to 6E. At both the encoder and decoder side, the case of partitioning a CTU 181, 182, 183, 184 into one or more sub-blocks (CUs) 181a-181g, 182a-182d can be identified by way of the CTU's coding tree signaled in the bit-stream. For example, splitting a block by a quad tree may lead to four square sub-blocks, while splitting a block by a (generalized) binary tree may lead to two (generalized) rectangular sub-blocks.

Figure 6B:
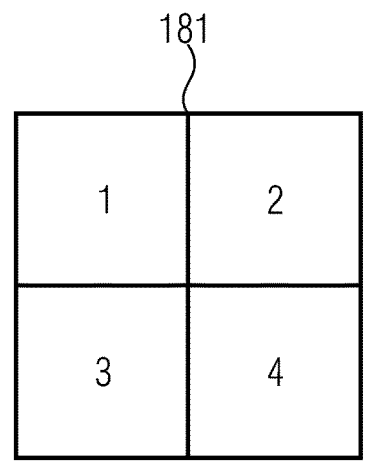
Figure 6C:
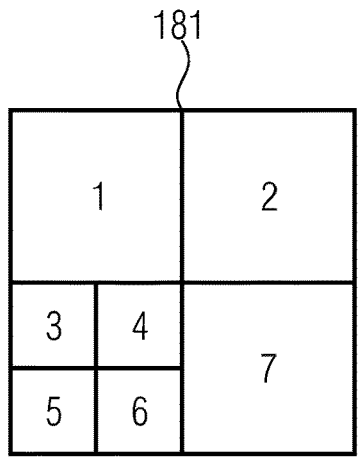
Figure 6D:
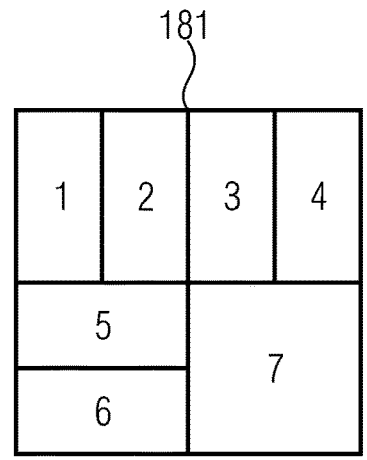
Figure 6E:
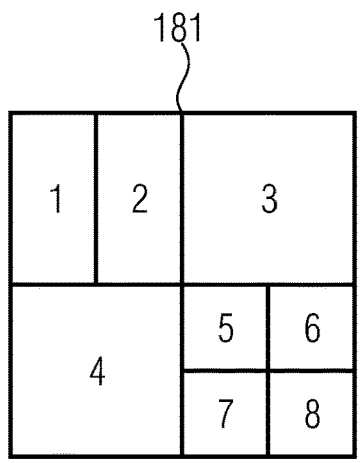

FIG. 6B shows an exemplary partitioning of coding block 181 into four square sub-blocks (1 to 4) splitted by a quad tree. FIG. 6C shows an exemplary partitioning of coding block 181 into seven square sub-blocks (1 to 7) splitted by a quad tree. FIG. 6D shows an exemplary partitioning of coding block 181 into seven sub-blocks, wherein sub-block 7 is a square sub-block splitted by a quad tree, wherein sub-blocks 1 to 4 are generalized rectangular sub-blocks vertically splitted by a binary tree, and wherein sub-blocks 5 and 6 are generalized rectangular sub-blocks horizontally splitted by a binary tree. FIG. 6E shows an exemplary partitioning of coding block 181 into seven sub-blocks, wherein sub-blocks 1 and 2 are generalized rectangular sub-blocks vertically splitted by a binary tree, and wherein sub-blocks 3 to 8 are square sub-blocks splitted by a quad tree.

In other words, the decoder 20 may be configured to read partitioning information (e.g. quad tree, binary tree) from the data stream 14. The decoder 20 may further be configured to perform the subjecting of the tree root blocks (CTUs) 181, 182, 183, 184 to the recursive multi-tree sub-divisioning depending on said partitioning information. The decoder 20 may further be configured to determine the first measure depending on said partitioning information.

According to an embodiment, the decoder 20 may be configured to determine the first measure by determining, for each tree root block (CTU) 181, 182, 183, 184, the number of leaf blocks (sub-blocks) 181a-181g, 182a-182d into which the respective tree root block (CTU) 181, 182, 183, 184 is split. In the following, this first measure may be referenced with capital letter A. That is, A may represent, for each tree root block (CTU), the number of leaf blocks or sub-blocks (CUs), respectively.

CTUs 181, 182, 183, 184 with low visual activity (i.e. few image details) are typically not sub-partitioned or are sub-partitioned into only a few relatively large sub-blocks, as shown in FIG. 6A, for example. Moreover, for these low-activity CTUs 181, 182, 183, 184, the spatial intra-picture prediction (and temporal inter-picture prediction, if applicable) typically works very efficiently. As a result, the prediction residuals 24'' in said CTUs 181, 182, 183, 184 may comprise very little signal energy and, thus, can often be fully quantized to zero and, in doing so, can be exempt from transmission.

Sometimes, though, at least one sub-block in such a low-activity CTU 181, 182, 183, 184 may exhibit relatively high signal variance in its prediction residual 24'', thus requiring a transmission of at least one (coarsely) quantized residual which is not fully zero and which is likely to cause visible blocking in the decoded picture 12'.

Residual coefficient signals, which are also referred to as residual transform units (TU) in HEVC, are each associated with one sub-block. In other words, each sub-block (CU) may comprise a transform unit (TU) for performing a piecewise transformation of the prediction residual with at least one transform unit per block, i.e. per coding block or per sub-block depending on the granularity of partitioning. Accordingly, in the coding tree, for each tree root block (CTU), a number of leaf blocks (CUs) and a number of coefficient blocks (TUs) may be determined.

A coded block flag (CBF) may indicate whether a residual coefficient signal (TU) has been fully quantized to zero (CBF=0) or whether a residual coefficient signal (TU) has not been fully quantized to zero (CBF=1). The latter may also be referred to as a non-zero coded block flag, or non-zero CBF. The number of non-zero coded block flags (CBF=1) may be signaled in the bitstream for each CTU.

In the following, the number of non-zero coded block flags (CBF=1) may be referenced with capital letter B. In other words, the capital letter B may represent the number of coefficient blocks being not fully quantized to zero. According to the inventive principle, this number B of non-zero coded blocks may represent the second measure.

According to such an embodiment, the decoder 20 may be configured to decode the prediction residual from the data stream 14 in units of coefficient blocks (TUs) representing a piecewise transformation of the prediction residual with at least one coefficient block (TU) per block (CTU or CU). The decoder 20 may further be configured to determine the second measure B by determining, for each tree root block (CTU), the number of coefficient blocks (TUs) being not fully quantized to zero. This may be managed by counting the number of non-zero coded block flags (CBF=1) in the CTU, for example.

As a non-limiting example, CTUs 181, 182, 183, 184 which are sub-partitioned into fewer than nine (i.e. A<9) sub-blocks (CUs) with, at the same time, the non-zero coding and transmission of B>0 residual coefficient signals (TUs, each associated with one sub-block), may benefit most from the application of very strong deblocking or deringing post-filters. Accordingly, these CTUs may be candidate blocks for being subject to very strong deblocking or deringing.

Figure 6F:
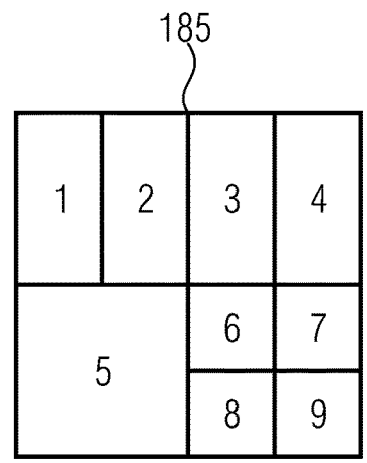

For example, FIG. 6F shows a partitioning of coding block 185 into nine sub-blocks, i.e. the number of sub-blocks in this example is A=9. Thus, the above mentioned condition of A<9 would, for example, not be met. Thus, the coding block 185 of FIG. 6F may not be subject to very strong deblocking post-filters. Accordingly, this CTU 185 may not be a candidate block for being subject to very strong deblocking or deringing.

Again, at both the encoder and decoder side, the case of partitioning into fewer than A sub-blocks can be identified by way of the CTU's coding tree signaled in the bit-stream, whereas the presence of B non-zero residual coefficient signals can be noticed by counting the number of non-zero coded block flags (CBFs) in the CTU, which are also signaled in the bit-stream.

As mentioned above, it may be checked whether a block (CTU) is a potential candidate block for being subject to a very strong deblocking or deringing using the deblocking or deringing filter, or whether this block shall rather be subject to a lower strength of deblocking or deringing. This corresponds to the herein described principle of a highly selective control of the application of said strong deblocking filtering. In other words, the strength of the deblocking or deringing filter may be locally varied.

This local variation of the filter strength may depend on two measures, namely a first measure A representing the number of sub-blocks into which the respective coding block is split, and on a second measure B representing the number of non-zero coded residuals. If a block fulfils these two measures A and B, then this block is a potential candidate block for being subject to strong deblocking or deringing. This may be indicated in the bit stream by means of a filter control parameter (FCP).

Thus, according to such an embodiment, the decoder 20 may perform the local variation of the filter strength by, for first portions of the picture (i.e. for candidate blocks), where the first and second measures A, B fulfill a predetermined criterion (e.g. A<9, B>0), reading strength information (FCP) from the data stream 14 indicative of a strength of the deblocking or deringing filter 110 to be applied at the respective portion (i.e. block). For second portions of the picture (i.e. for non-candidate blocks), where the first and second measures A, B do not fulfill the predetermined criterion (e.g. A<9, B>0), the decoder 20 may be configured to set the strength of the deblocking or deringing filter 110 to be applied at the respective portion (block) to a lower second strength which is lower than the first filter strength.

Thus, at least for the above mentioned non-limiting example, it can be summarized that Condition 1: a desired in-loop filtering (e.g. very strong deblocking) shall be allowed in a CTU if
the signaled coding tree indicates a partitioning of said CTU into fewer than A sub-blocks, and/or
the number of non-zero valued CBFs (i.e. CBF=1) signaled in said CTU is B, where B>0.

In other words, if condition 1 is not met, said desired in-loop filtering shall be disallowed and shall, therefore, always be disabled in the affected CTU at both the encoder and decoder side. If, on the other hand, condition 1 is met in a CTU, the desired in-loop filtering is allowed, but this does not necessarily mean that said in-loop filtering is also enabled.

In the above described non-limiting example, the predetermined criterion, i.e. Condition 1, was met when A<9 and B>0. However, stated in more general terms, the predetermined criterion is fulfilled if the first measure A falls below a predetermined threshold, and if the second measure B exceeds or is equal to a second predetermined threshold.

For example, the first predetermined threshold is p with p fulfilling 1<p<17 for each of the tree root blocks (CTUs), i.e. A<p. Additionally or alternatively, the second predetermined threshold is q with q fulfilling −1<q<51, i.e. B≥q.

In fact, as discussed above, it is highly desirable to provide a means for realizing highly selective control of the application of super-strong in-loop filters such as very strong deblocking filters. One exemplary way to provide this means is to Condition 2: signal an in-loop filter control parameter (FCP), e.g. via transmission in a bit stream, in a CTU if condition 1 is met for said CTU.

In other words, if condition 1 is not met, said in-loop filter control parameter (FCP) is not signaled. If, on the other hand, condition 1 is met in a CTU, said filter control parameter (FCP)—e.g., an additional single-bit element—is written to the bit-stream by the encoder and read from said bit-stream by the decoder.

If the filter control parameter is present in the bit-stream (i.e., condition 1 is met) for a given CTU, then the value of this control parameter determines whether the decoder is to enable the desired in-loop filtering (e.g. value 1) or to disable it (e.g. value 0) in said CTU.

In this way, the encoder can control—and signal—the desired application of, e.g. very strong deblocking.

Summarizing, the concept of the present application may suggest a selective signaling of an in-loop filter control parameter per coding block (e. g., coding tree unit, CTU), to disable or attenuate the application of said in-loop filter in said coding block. The in-loop filter control parameter may only be signaled if the coding block is partitioned into fewer than A sub-blocks or if residual coefficient coding (i.e. non-zero coding) is applied in B of the sub-blocks.

Figure 7:
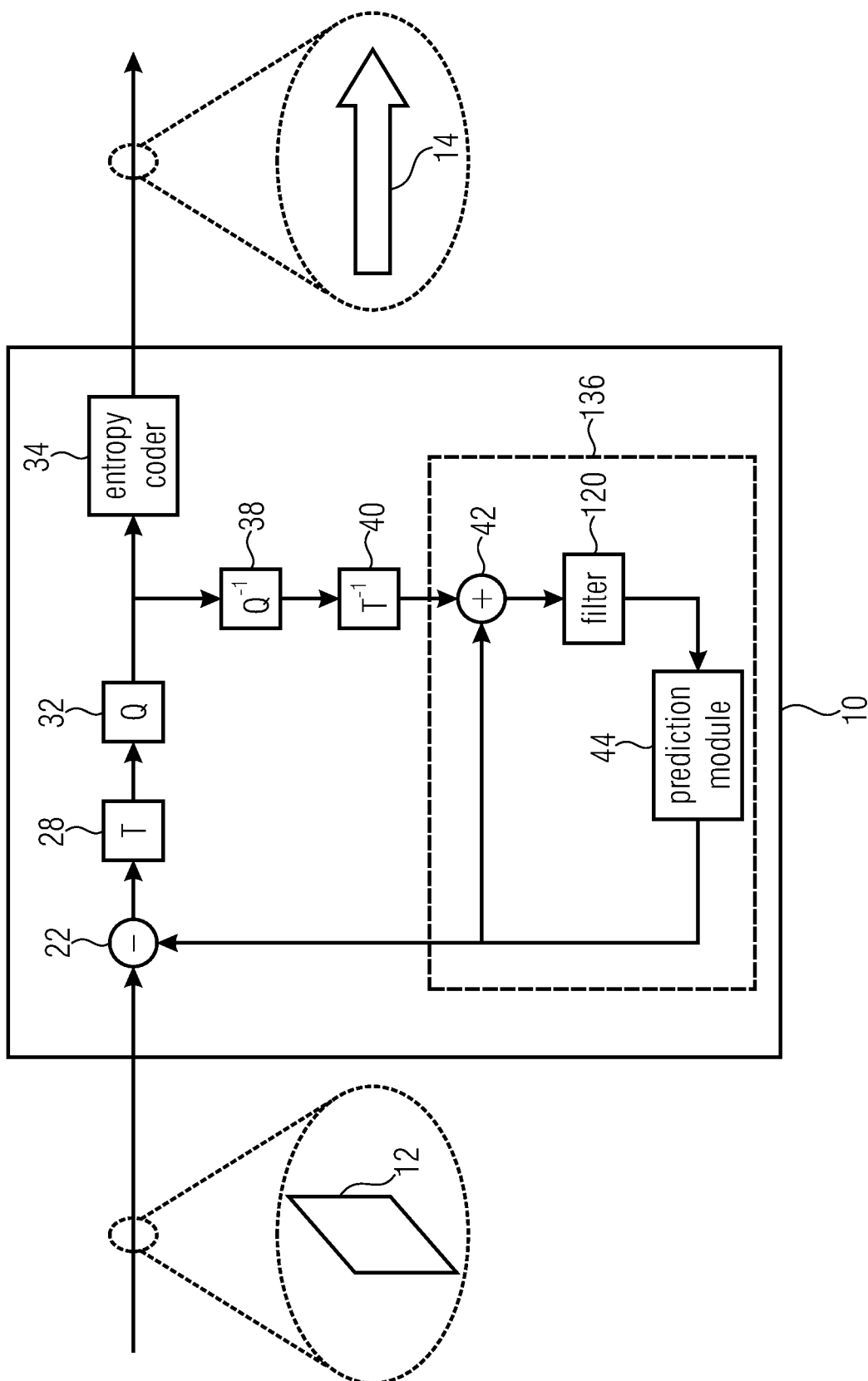
FIG. 7 shows a schematic block diagram of an encoder according to an embodiment.

FIG. 7 shows an encoder 10 which may be applied according to the concept of the present application according to the first aspect of the invention. The encoder 10 as depicted in FIG. 7 may comprise a similar internal structure as the one described above with reference to FIG. 1. Thus, equal or equivalent elements or elements with equal or equivalent functionality are denoted in FIGS. 1 and 7 by equal or equivalent reference numerals. However, the encoder 10 of FIG. 7 may differ from the encoder of FIG. 1 in that it may additionally comprise a deblocking or deringing filter 120 for filtering and attenuating blocking and/or ringing artefacts, wherein blocking may be regarded as a particular case of a ringing artefact. The deblocking or deringing filter 120 may be an in-loop filter.

The encoder 10 is configured for block-based encoding of picture data using a deblocking or deringing filter 120 as an in-loop filter. The encoder 120 may further be configured to encode, in a blockwise manner, a picture 12 into a data stream 14 using prediction and by coding a prediction residual into the data stream 14 with providing a reconstructed version of the picture in a prediction loop 136 of the encoder 10. The prediction loop 136 may be a part of the prediction stage 36 which was already explained above with reference to FIG. 1.

In said prediction loop 136, the reconstruction of the picture 12 and applying the deblocking or deringing filter 120 may be simulated. Accordingly, the encoder 10 may be configured to apply the deblocking or deringing filter 120 onto the reconstructed version 12' of the picture 12.

In said prediction loop 136, the encoder 10 may further try different filter strengths of the deblocking or deringing filter 120 in a similar fashion as explained above for the decoder side. In particular, the filter strength may be varied depending on the above described first measure A and second measure B. Accordingly, the encoder 10 may be configured to locally vary a strength of the deblocking or deringing filter 120 depending on a first measure A locally measuring a mean block size, and a second measure B locally measuring a frequency of non-zero coding of the prediction residual.

The encoder 10 is further configured to partition the picture 12 into blocks (CTUs) 181, 182, 183, 184, as described in FIG. 3 and FIGS. 6A to 6F above. The encoder 10 is further configured to perform the encoding using the blocks 181, 182, 183, 184, wherein the first measure A is designed to locally measure a size of the blocks 181, 182, 183, 184.

In particular with reference to FIGS. 6A to 6F, the encoder 10 may also split the blocks 181, 182, 183, 184 into one or more sub-blocks by using a multi-tree subdivisioning, wherein the coding tree may, for instance, be a quad tree or a (generalized) binary tree.

Thus, the encoder 10 may be configured to perform the partitioning by subjecting each of a plurality of tree root blocks (CTUs) 181, 182, 183, 184 into which the picture 12 is pre-partitioned to recursive multi-tree sub-divisioning so that the blocks 181, 182, 183, 184 form leaf blocks (sub-blocks or CUs) of the plurality of tree-root blocks 181, 182, 183, 184. Furthermore, the encoder 10 may be configured to determine the first measure A and the second measure B locally for each tree root block 181, 182, 183, 184.

To do so, the encoder 10 may try, in the prediction loop 136, one or more different types of multi-tree sub-divisioning. If the encoder 10 found a multi-tree sub-divisioning which works well with the respective CTU, then the encoder 10 selects this multi-tree sub-divisioning and adds corresponding partitioning information into the bit stream, based on the selected multi-tree sub-divisioning. Depending on said inserted partitioning information, the encoder 10 may determine the first measure A.

For example, as shown in FIG. 6E, the encoder 10 may select a combined quad tree—binary tree scheme for splitting the CTU 181 into six square sub-blocks (sub-blocks 3 to 8) and into two rectangular sub-blocks (sub-blocs 1 and 2). Accordingly, the encoder 10 may split the coding block (CTU) 181 into eight sub-blocks (CUs) which corresponds to a first measure A of A=8.

Stated in terms of the coding tree, the encoder 10 may be configured to perform the subjecting of each of the plurality of tree root blocks to the recursive multi-tree sub-divisioning based on partitioning information (e.g. quad tree/binary tree). The encoder 10 may insert the partitioning information into the data stream 14, and the encoder 10 may determine the first measure A depending on the partitioning information.

The encoder 10 may determine the first measure A on a block-wise basis. That is, the encoder 10 may determine the number of sub-blocks (CUs) for each coding block (CTU) 181, 182, 183, 184 separately.

Thus, in terms of the coding tree, the encoder 10 may be configured to determine the first measure A by determining, for each tree root block (CTU) 181, 182, 183, 184, the number of leaf blocks (CUs or sub-blocks) into which the respective tree root block (CTU) 181, 182, 183, 184 is split.

As described above, with respect to the decoder 20, also the encoder 10 may be configured to predictively code picture data using one or more prediction residual signals.

Residual signals, which are also referred to as residual transform units (TU) in HEVC, are each associated with one sub-block (CU). In other words, each sub-block (CU) may comprise a transform unit (TU) for performing a piecewise transformation of the prediction residual with at least one transform unit per block, i.e. per coding block or per sub-block depending on the granularity of partitioning. Accordingly, in the coding tree, for each tree root block (CTU), a number of leaf blocks (CUs) and a number of coefficient blocks (TUs) may be determined.

A coded block flag (CBF) may indicate whether a residual coefficient signal (TU) has been fully quantized to zero (CBF=0) or whether a residual coefficient signal (TU) has not been fully quantized to zero (CBF=1). The latter may also be referred to as a non-zero coded block flag, or non-zero CBF. The non-zero coded block flags (CBF=1) may be signaled in the bitstream for each CTU.

In the following, the number of non-zero coded block flags (CBF=1) may be referenced with capital letter B. In other words, the capital letter B may represent the number of coefficient blocks being not fully quantized to zero. According to the inventive principle, this number B of non-zero coded blocks may represent the second measure.

Accordingly, the encoder 10 may be configured to encode the prediction residual into the data stream 14 in units of coefficient blocks (TUs) representing a piecewise transformation of the prediction residual with at least one coefficient block (TU) per block (CTU or CU). The encoder 10 may further be configured to determine the second measure B by determining, for each tree root block (CTU), the number of coefficient blocks (TU) being not fully quantized to zero.

Again, at both the encoder and decoder side, the first measure A, i.e. the number of sub-blocks (CUs) into which a coding block (CTU) is partitioned can be identified by way of the CTU's coding tree that can be signaled in the bit-stream by the encoder 10, whereas the presence of B non-zero residual coefficient signals can be noticed by counting the number of non-zero coded block flags (CBFs) in the CTU, which may also be signaled in the bit-stream by the encoder 10.

In the prediction loop 136, it may be checked whether a block (CTU) is a potential candidate block for being subject to a very strong deblocking or deringing using the deblocking or deringing filter, or whether this block shall rather be subject to a lower strength of deblocking or deringing. This corresponds to the herein described principle of a highly selective control of the application of said strong deblocking filtering at the encoder side. In other words, the strength of the deblocking or deringing filter may be locally varied.

This local variation of the filter strength may depend on two measures, namely a first measure A representing the number of sub-blocks into which the respective coding block is split, and on a second measure B representing the number of non-zero coded residuals. If a block fulfils these two measures A and B, then this block is a potential candidate block for being subject to strong deblocking or deringing. This may be indicated in the bit stream by the encoder 10 by means of a filter control parameter (FCP).

Thus, according to such an embodiment, the encoder 10 may perform the local variation of the filter strength by, for first portions of the picture (i.e. for candidate blocks), where the first and second measures A, B fulfill a predetermined criterion (e.g. A<9, B>0), inserting strength information (FCP) into the data stream 14 indicative of a strength of the deblocking or deringing filter 120 to be applied at the respective portion (i.e. block). For second portions of the picture (i.e. for non-candidate blocks), where the first and second measures A, B do not fulfill the predetermined criterion (e.g. A<9, B>0), the encoder 10 may be configured to set the strength of the deblocking or deringing filter 120 to be applied at the respective portion (block) to a lower second strength which is lower than the first filter strength.

In the above described non-limiting example, the predetermined criterion, i.e. Condition 1, was met when A<9 and B>0. However, stated in more general terms, the predetermined criterion is fulfilled if the first measure A falls below a predetermined threshold, and if the second measure B exceeds or is equal to a second predetermined threshold.

For example, the first predetermined threshold is p with p fulfilling 1<p<17 for each of the tree root blocks (CTUs), i.e. A<p. Additionally or alternatively, the second predetermined threshold is q with q fulfilling −1<q<51, i.e. B≥q.

The operating principles of the encoder 10 and the decoder 20 shall be briefly summarized as follows:

The encoder 10 may calculate an optimal partitioning in a rate-distortion loop. Based on this calculation, the encoder 10 may check if the above mentioned Condition 1 (candidate block) is fulfilled. If Condition 1 is fulfilled, then the encoder 10 may try a strong deblocking per CTU. If the strong deblocking leads to measurable improvements (e.g. gain of SNR or SSIM) in the CTU, then the encoder 10 may use the strong deblocking for this CTU and signalize an in-loop filter control parameter (FCP) value, e.g. FCP=1 (enabled), for said CTU in the bit stream 14. Otherwise, if there is no measurable improvement, e.g. gain in SNR or SSIM, or if there is even a loss in SNR or SSIM, when applying the strong deblocking, then the encoder 10 may discard the result of the strong deblocking and signalize a respective in-loop filter control parameter (FCP) value, for example an in-loop filter control parameter (FCP) value of zero FCP=0 (disabled), for the respective CTU. This shall signal towards the decoder 20 to refrain from using strong deblocking for said CTU. If the encoder 10 may determine that Condition 1 is not fulfilled, no in-loop filter control parameter (FCP) will be signalized in the bit stream 14 and, thus, strong deblocking will not be tried out for the respective CTUs.

The decoder 20 may receive the bit stream 14 with the previously calculated optimal partitioning of the CTU. Based on the corresponding partitioning information, the decoder 20 may check, for each CTU, whether Condition 1 is fulfilled. If Condition 1 is fulfilled in the respective CTU, an in-loop filter control parameter (FCP) is read from the bit stream 14. If the value of the in-loop filter control parameter (FCP) is enabled (e.g. FCP=1) the strong deblocking will be exploited. If the value of the in-loop filter control parameter (FCP) is disabled (e.g. FCP=0) the strong deblocking will not be exploited. If the decoder 20 may determine that Condition 1 is not fulfilled, no in-loop filter control parameter (FCP) will be read from the bit stream 14 and, thus, strong deblocking will not be exploited for the respective CTUs.

Figure 8:
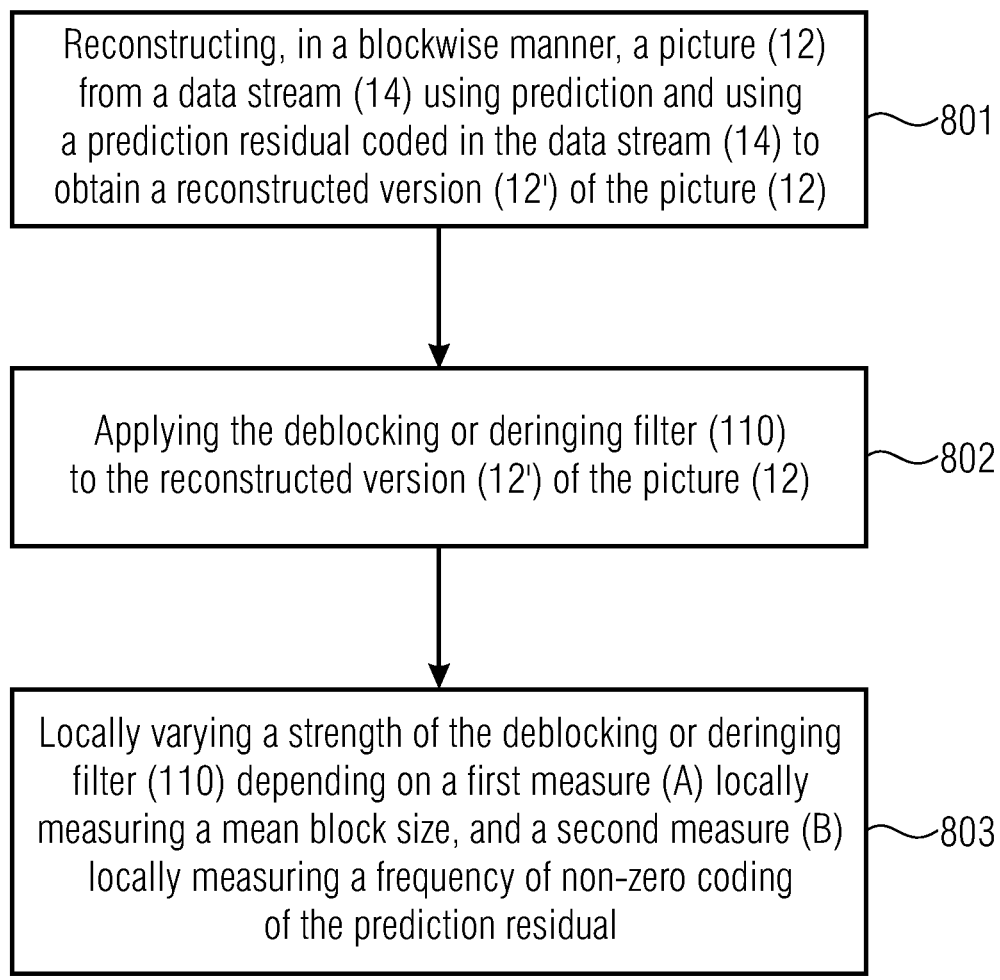
FIG. 8 shows a block diagram of a method for block-based decoding of picture data using a deblocking or deringing filter according to an embodiment.

FIG. 8 shows a schematic block diagram of a method for block-based decoding of picture data using a deblocking or deringing filter 110.

In block 801 a picture is reconstructed, in a blockwise manner, from a data stream 14 using prediction and using a prediction residual coded in the data stream 14 to obtain a reconstructed version 12' of the picture 12.

In block 802 the deblocking or deringing filter 110 is applied to the reconstructed version 12' of the picture 12.

In block 803 a strength of the deblocking or deringing filter 110 is locally varied depending on a first measure A locally measuring a mean block size, and a second measure B locally measuring a frequency of non-zero coding of the prediction residual.

Figure 9:
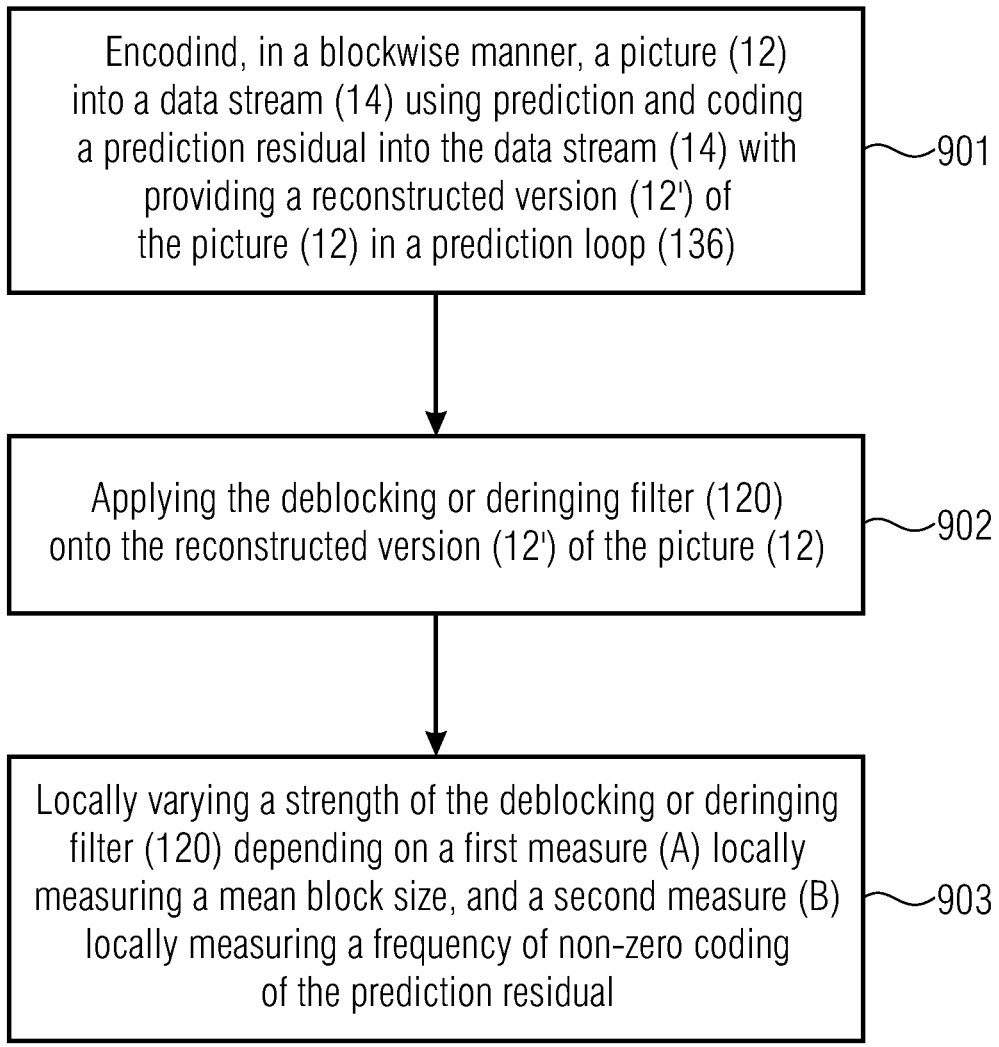
FIG. 9 shows a block diagram of a method for block-based encoding of picture data using a deblocking or deringing filter as an in-loop filter according to an embodiment.

FIG. 9 shows a schematic block diagram of a method for block-based encoding of picture data using a deblocking or deringing filter 120 as an in-loop filter.

In block 901, a picture 12 is encoded, in a blockwise manner, into a data stream 14 using prediction and coding a prediction residual into the data stream 14 with providing a reconstructed version 12' of the picture 12 in a prediction loop 136.

In block 902 the deblocking or deringing filter 120 is applied to the reconstructed version 12' of the picture 12.

In block 903 a strength of the deblocking or deringing filter 120 is locally varied depending on a first measure A locally measuring a mean block size, and a second measure B locally measuring a frequency of non-zero coding of the prediction residual.

Second Aspect

In the above discussed first aspect, a selective signaling of an (in-loop) filter control, e.g. by means of a filter control parameter, was suggested in order to choose between different deblocking or deringing filters to be applied on a picture. In the following, the second aspect will be discussed, wherein a deblocking filter concept is suggested. Said deblocking or deringing filter according to the second aspect may be combined with the first aspect, or it may be applied separately in encoders and/or decoders and/or methods different from the first aspect.

Conventional deblocking methods based on the signal adaptive approach applied in HEVC (see the Introduction section on page 1) generally lead to subjective improvements but, sometimes, are still too weak to remove excessive blocking artifacts around large coding blocks, as mentioned earlier. In combination with the first aspect described previously, it was found beneficial to apply "superstrong" deblocking filtering with a larger filter support (e. g., 16 spatial samples) then what is used in the state of the art (e.g., 4 or 8 samples). Given that the filter control parameter (FCP) introduced in the first aspect allows control over the filtering process on the encoder side, e.g., by means of rate/distortion testing, it can also be concluded that the application of very simple superstrong deblocking filters, with little or no signal-adaptive strength control, is sufficient (since their execution can be disabled by the encoder using the signaled FCP).

For example, if FCP=0 in a CTU, traditional deblocking with decoder-side filter strength detection on the reconstructed image component may be applied for each TU sub-area of the CTU. If FCP=1 in a CTU, the very strong deblocking filter described herein may be used on each TU whose width and height both equal 32 or more pixels. It can be extended by a decoder-side filter strength detection. A filter may remain strong enough, i.e., it may advantageously employ between 8 and 16 filter taps.

The first step in a superstrong deblocking algorithm is the derivation of left, right, top, and bottom boundary offsets for each TU satisfying the above size constraint. Specifically, given d={left, right, top, bottom}, $$\text{offset}_d = \text{Clip3}(-127, 127, (P_d - Q_d + N_d) >> (\log_2(N_d) + 1)),$$

where $P_d$ and $Q_d$ are the sums of the outer and inner boundary reconstructed samples of the TU, respectively (excluding the outer four corner samples), along the direction d of length $N_d$ (i. e., the TU width resp. height). Unavailable $P_d$ sums at slice or image borders are replaced by the adjacent $Q_d$ sums. Then, upon deblocking in case of FCP=1 in a CTU (see also first aspect), weighted additions of offset$_d$ may be applied, for each d, along the 16 inner boundary sample columns or rows perpendicular to d. This adds a linear ramp with slope offset$_d$÷16 towards the d TU boundary, reaching offset$_d$ at the boundary, with blend-overs at the TU corners.

In a modification, the very strong deblocking may be executed before the traditional deblocking on the luma as well as chroma channels (note that, for 4:2:0 [spatially downsampled] chroma, the three bold values above are halved).

In summary, a conventional superstrong corrective deblocking algorithm may depend on four control values (mean offset values computed along left, right, top, and bottom block boundaries, respectively) with undisclosed blend-overs of the four control values at the four block corners.

However, these conventional deblocking algorithm may lead to blocking or ringing artefacts, particularly in areas near block corners, which may lead to a partially suboptimal subjective perception of the coding quality. Given the partially suboptimal subjective performance of the state of the art, the second aspect of the invention suggests improvements by means of a corrective deblocking design dependent on eight instead of four control values.

Said inventive eight-value corrective deblocking approach extends the conventional four-value design by four additional corner values, i.e., a mean offset value offset$_c$ for each of the c={top-left, top-right, bottom-left, bottom-right} corners of the given block. Furthermore, given the conventional undisclosed (and suboptimal) blend-over implementation of the conventional technology, a detailed embodiment of an inventive blend-over algorithm for deblocking around the block corners, using pairs of adjacent control values, will be described.

Figure 10:
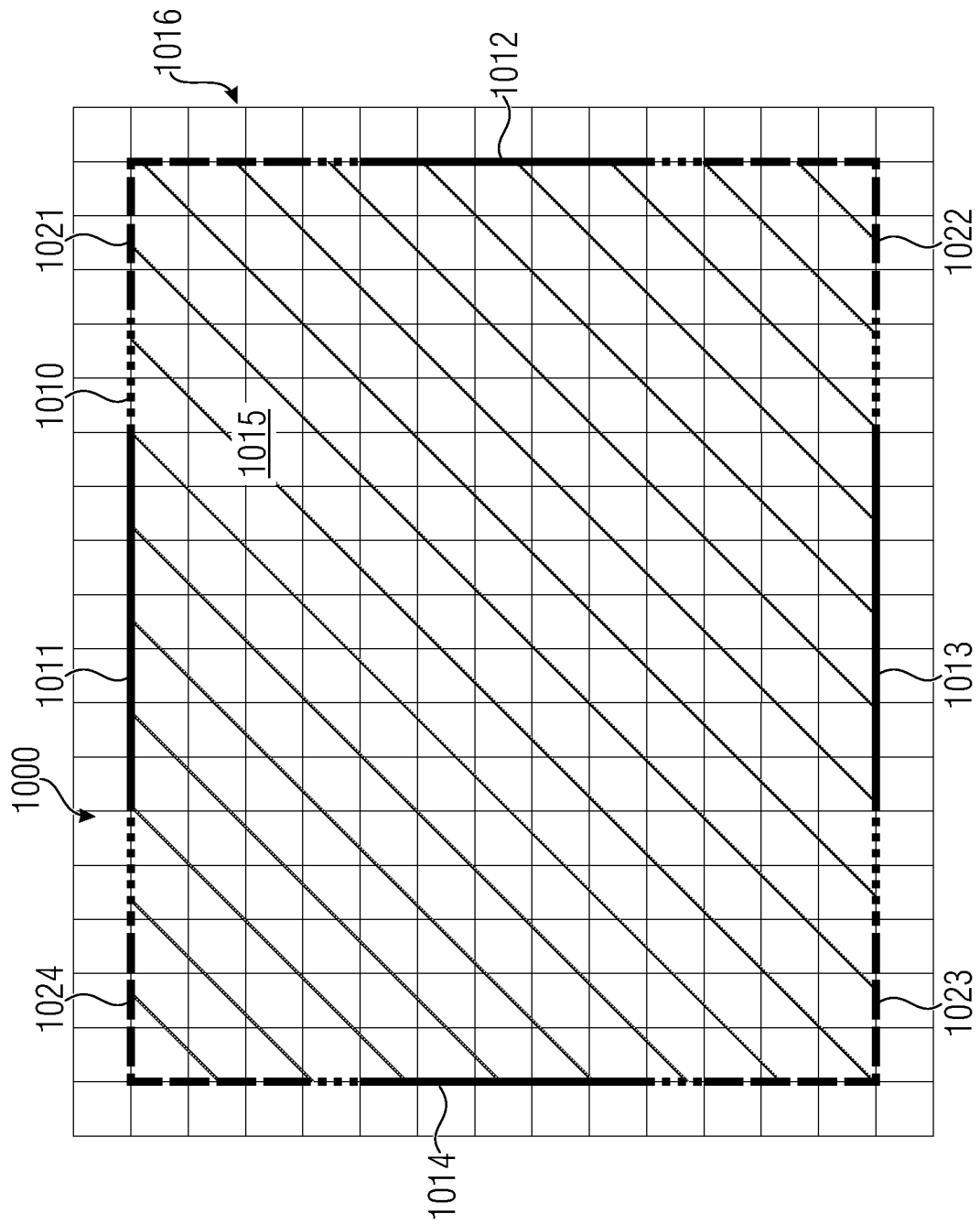
FIG. 10 shows a block comprising border portions onto which a deblocking filter according to an embodiment may be applied.

FIG. 10 shows an example of a block 1000 that may be processed by the deblocking filter according to the second aspect of the invention. The block 1000 may be a subblock of a block based coding scheme. For instance, the block 1000 may be a so-called Transform Unit (TU).

The block 1000 may comprise a square or generally rectangular shape. The block 1000 may comprise a block border 1010, which may represent the outer circumferential demarcation of the block 1000. The block border 1010 may comprise a plurality of border portions into which the block border 1010 may be subdivided.

The block 1000 may comprise at least four corners and four edges extending between said four corners. Accordingly, the block border 1010 may comprise four corner border portions 1021, 1022, 1023, 1024 and four edge border portions 1011, 1012, 1013, 1014 extending between the four corner border portions 1021, 1022, 1023, 1024.

The block 1000 may contain a plurality of pixels representing a picture content 1015. The picture content inside the block 1000 is illustrated by means of hatched lines. There may also be picture content 1016 outside the block 1000 which may be represented by surrounding pixels. Said surrounding picture content (surrounding pixels) 1016 may be arranged around the block 1000 along the respective border portions 1011, 1012, 1013, 1014, 1021, 1022, 1023, 1024.

The picture content 1015 inside the block 1000 may yet be unfiltered, and it may thus be referred to as an unfiltered content of the block 1000. Applying the deblocking filter on said yet unfiltered picture content 1015 may provide a filtered picture content, which may also be referred to as a filtered content of the block 1000.

Therefore, the deblocking filter may compare the yet unfiltered picture content 1015 inside the block 1000 with an adjacent picture content 1016 outside the block 1000. This may be done at each of the at least eight border portions 1011, 1012, 1013, 1014, 1021, 1022, 1023, 1024.

Figure 11:
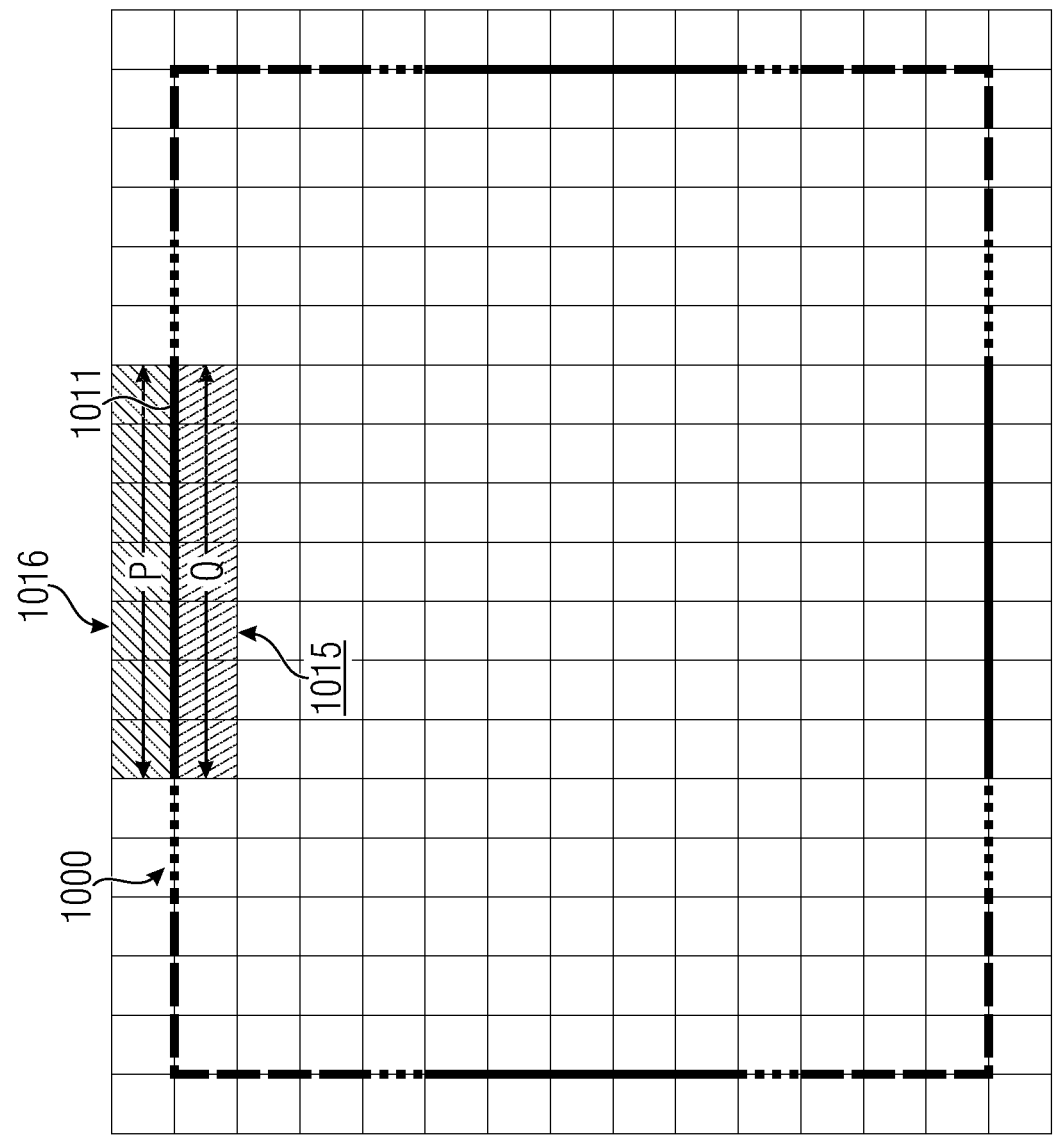
FIG. 11 shows the block of FIG. 10, wherein edge boundary sample vectors are depicted, for applying the deblocking filter according to an embodiment.

For example, as shown in FIG. 11, a yet unfiltered picture content 1015 inside the block 1000 which extends along the first edge border portion 1011 may be compared with the adjacent picture content 1016 which also extends along the first edge border portion 1011 but outside the block 1000. The picture content 1015 inside the block 1000 may differ from the picture content 1016 outside the block 1000. Thus, a dissimilarity between the picture content 1015 inside the block 1000 and the picture content 1016 outside the block 1000 may exist, which may be determined by the deblocking filter.

Processing, i.e. deblocking filtering, of the deblocking filter may be adjusted based on said dissimilarities. In other words, the deblocking filtering may be parametrized based on the determined dissimilarities between the picture content 1015 inside the block 1000 and the picture content 1016 outside the block 1000.

Thus, according to an embodiment, a deblocking filter for filtering a block 1000 of a picture is suggested, wherein the deblocking filter may be configured to determine, for each of at least eight border portions 1011, 1012, 1013, 1014, 1021, 1022, 1023, 1024 of a border 1010 of the block 1000, a dissimilarity between an unfiltered content 1015 of the block 1000 and a surrounding picture content 1016 around the block 1000 along the respective border portion 1011, 1012, 1013, 1014, 1021, 1022, 1023, 1024, the eight border portions 1011, 1012, 1013, 1014, 1021, 1022, 1023, 1024 including four corner border portions 1021, 1022, 1023, 1024, each arranged at a corner of the block 1000, and four edge border portions 1011, 1012, 1013, 1014, each arranged at intermediary portions of the border 1010 between the corners of the block 1000. The deblocking filter may further be configured to parametrize a deblocking filtering of the block 1000 using the dissimilarities determined for the at least eight border portions 1011, 1012, 1013, 1014, 1021, 1022, 1023, 1024 in order to obtain a filtered content of the block 1000.

Calculation of the Deblocking Control Values from Boundary Block Samples

Still with reference to FIG. 11, the exemplarily illustrated picture content 1015 inside the block 1000 and the exemplarily illustrated picture content 1016 outside the block 1000 may each comprise a plurality of pixels, also referred to as samples. For instance, a plurality of first samples may be located inside the block 1000 and a plurality of second samples may be located outside the block 1000.

According to an embodiment, the deblocking filter may be configured to determine, for each of the at least eight border portions 1011, 1012, 1013, 1014, 1021, 1022, 1023, 1024, the dissimilarity by computing a mean difference between first samples and second samples, said first samples being located inside the block 1000 and adjoining the respective border portion 1011, 1012, 1013, 1014, 1021, 1022, 1023, 1024, and said second samples being located outside the block 1000 and adjoining the respective border portion 1011, 1012, 1013, 1014, 1021, 1022, 1023, 1024.

The plurality of first samples may be subsumed in a first sample vector Q, and the plurality of second samples may be subsumed in a second sample vector P. Since the sample vectors P, Q may extend along a respective border portion 1011, 1012, 1013, 1014, 1021, 1022, 1023, 1024, said vectors P, Q may also be referred to as boundary sample vectors. Each boundary sample vector P, Q may comprise a sum of samples, e.g. the first sample vector Q may comprise a sum of first samples and the second sample vector P may comprise a sum of second samples.

The above example was described by referring to an edge border portion 1011. However, the same holds true for corner border portions 1021, 1022, 1023, 1024, as shall be exemplarily described with reference to FIG. 12.

Figure 12:
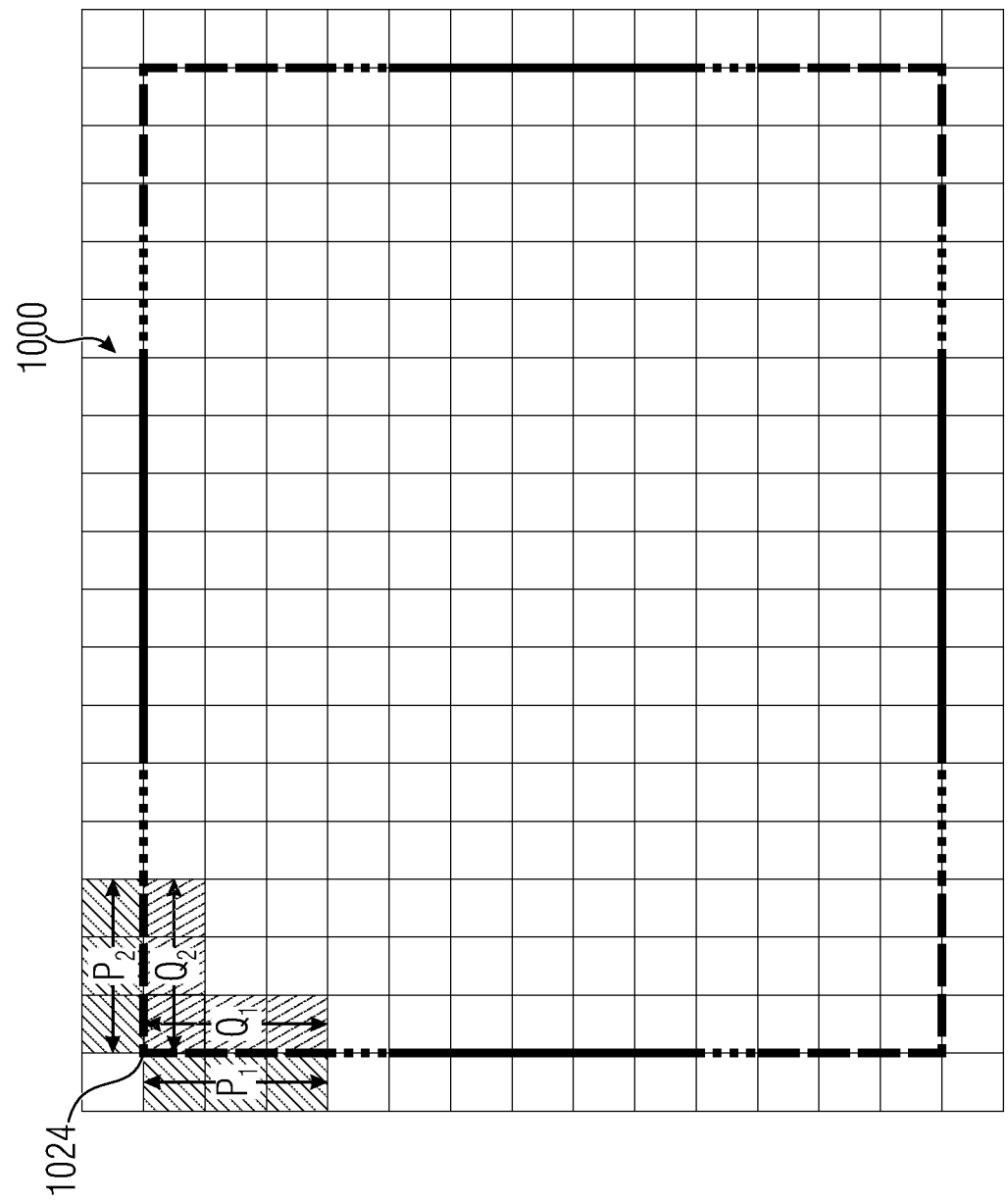
FIG. 12 shows the block of FIG. 10, wherein corner boundary sample vectors are depicted, for applying the deblocking filter according to an embodiment.

FIG. 12 shows a corner boundary portion 1024 in the left upper corner of the block 1000. An inner boundary sample vector $Q_1$ extends along a vertical part of the corner boundary portion 1024 inside the block 1000. Adjacent to the inner boundary sample vector $Q_1$ an outer boundary sample vector $P_1$ extends along a vertical part of the corner boundary portion 1024 outside the block 1000.

Furthermore, a further inner boundary sample vector $Q_2$ extends along a horizontal part of the corner boundary portion 1024 inside the block 1000. Adjacent to the further inner boundary sample vector $Q_2$ a further outer boundary sample vector $P_2$ extends along a horizontal part of the corner boundary portion 1024 outside the block 1000.

The inner boundary sample vectors $Q_1$ and $Q_2$ may be subsumed as a first corner sample vector $Q_c$ and the outer boundary sample vectors $P_1$ and $P_2$ may be subsumed as a second corner sample vector $P_c$.

According to an embodiment, the deblocking filter may be configured to determine, for each of the at least eight border portions 1011, 1012, 1013, 1014, 1021, 1022, 1023,

1024, the dissimilarity by computing a difference between a first sum (vector Q) over first samples and a second sum (vector P) over second samples, said first samples being located inside the block 1000 and adjoining the respective border portion 1011, 1012, 1013, 1014, 1021, 1022, 1023, 1024, and said second samples being located outside the block 1000 and adjoining the respective border portion 1011, 1012, 1013, 1014, 1021, 1022, 1023, 1024.

Accordingly, a (mean) difference between the first (inner) sample vectors Q and the second (outer) sample vectors P may be computed, which corresponds to $\Delta = P - Q$.

An offset between outer and inner sample vectors along edge border portions 1011, 1012, 1013, 1014 may be computed in a conventional manner, given d={left edge, right edge, top edge, bottom edge}:

$$\text{offset}_d = \text{Clip3}(-127, 127, (P_d - Q_d + N_d) << (\log_2(N_d) + 1)),$$

According to the herein described concept, in addition to the edge border portions 1011, 1012, 1013, 1014, an offset between outer and inner sample vectors along corner border portions 1021, 1022, 1023, 1024 may be computed, given c={top left corner, top right corner, bottom left corner, bottom right corner}:

$$\text{offset}_c = \text{Clip3}(-127, 127, (P_c - Q_c + N_c) << (\log_2(N_c) + 1)),$$

wherein the above mentioned (mean) difference $\Delta = P - Q$ is considered for corner boundary vectors $Q_c$ and $P_c$.

In other words, for each of the four corners c (top-left, top-right, bottom-left, and bottom-right), the corrective offset, to be used as control value in the actual deblocking processing, is the average of the difference between sets of outer ($P_c$) and inner ($Q_c$) boundary reconstructed samples around the (e.g. TU) block corner (again excluding the outer four corner samples). Advantageously, $N_c$ equals the filter support length, i.e., the number of columns/rows to be deblocked on each side of a block border 1010, but $N_c$ could also be a power-of-two fraction of $N_d$, i.e., the (TU) block width or height as in the conventional technology. More specifically, according to the herein described concept, $N_c = 16$ (or 8 in case of 4:2:0 chroma), while the conventional technology uses $N_d \geq 32$.

According to an embodiment, the deblocking filter may generally be configured to set widths of the at least eight border portions 1011, 1012, 1013, 1014, 1021, 1022, 1023, 1024 depending on a size of the block 1000 so that, at least for one of the eight border portions 1011, 1012, 1013, 1014, 1021, 1022, 1023, 1024, a width of the respective border portion 1011, 1012, 1013, 1014, 1021, 1022, 1023, 1024 equals a fraction of a length of the block's border 1010 which may vary for different block sizes. For example, the larger the block, the larger the width of a respective border portion 1011, 1012, 1013, 1014, 1021, 1022, 1023, 1024 may be. As mentioned above, the border portions 1011, 1012, 1013, 1014, 1021, 1022, 1023, 1024 may be fractions of the length of the blocks border 1010. In other words, the border portions 1011, 1012, 1013, 1014, 1021, 1022, 1023, 1024 themselves may always be shorter than the length of the block's border 1010.

With varying widths of the border portions 1011, 1012, 1013, 1014, 1021, 1022, 1023, 1024, also the spatial locations of the above discussed boundary vectors P and Q may be varied.

FIGS. 13A to 13D show the possible spatial locations of the $P_c$ and $Q_c$ sums of samples used in the derivation of offset$_c$ for the non-limiting example of c=top-left. Generally, an offset$_c$ can be calculated from four individual vector sums $P_1$, $P_2$, $Q_1$, $Q_2$, as illustrated, with $P_c = P_1 + P_2$ and $Q_c = Q_1 + Q_2$.

Figure 13A:
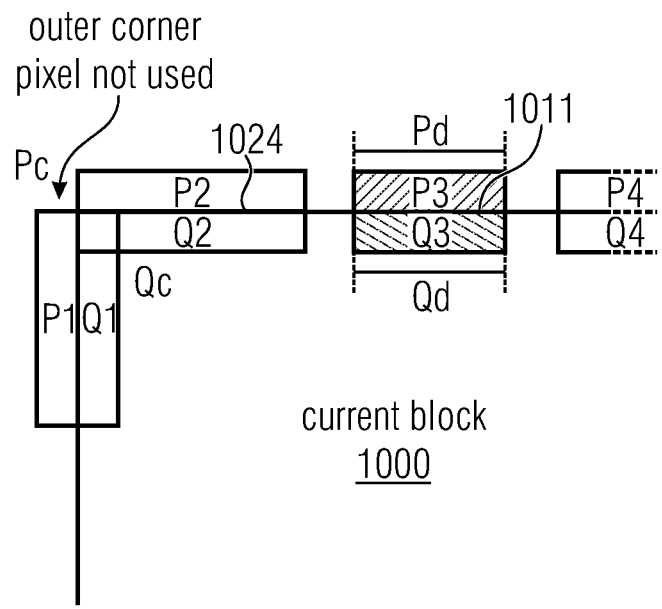
FIG. 13A-13D show an upper left corner of a block with different spatial positions of edge boundary vectors and corner boundary vectors according to an embodiment.
Figure 13B:
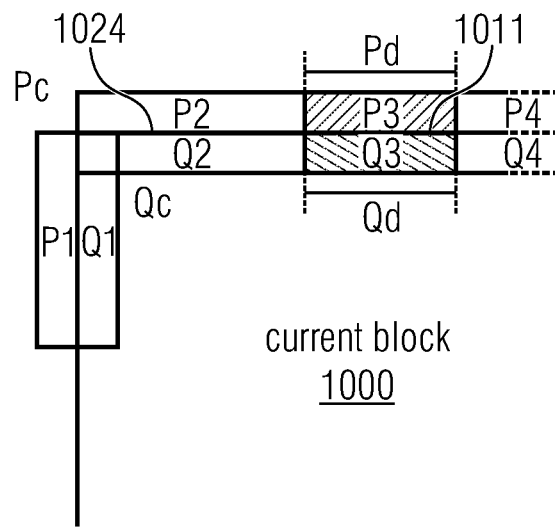
Figure 13C:
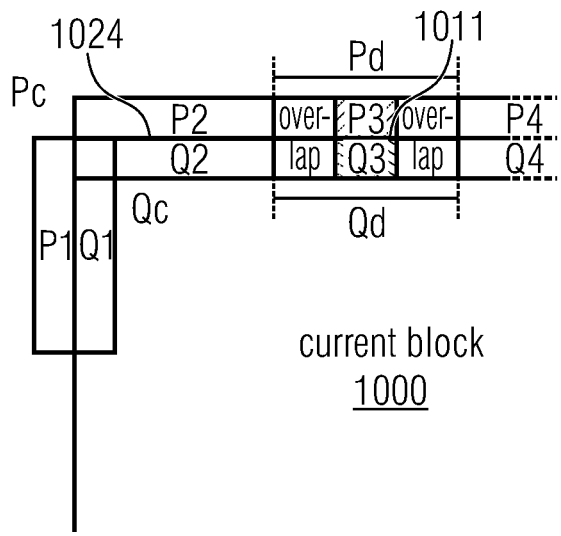
Figure 13D:
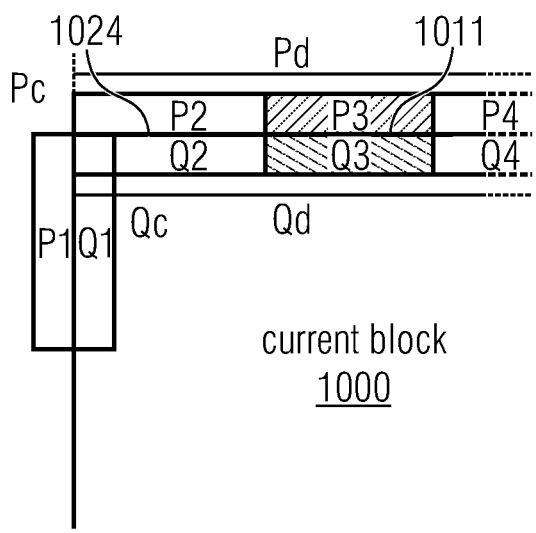

According to some examples, $P_2$ and $Q_2$ may not overlap or may partially overlap with $P_d$ and $Q_d$, as introduced in the conventional technology (in which case it can simply be defined $P_d = P_3$ and $Q_d = Q_3$, see FIGS. 13A to 13C), or $P_2$ and $Q_2$ may fully overlap with $P_d$ and $Q_d$ (in which case it can be specified $P_d = P_2 + P_3$ or $P_d = P_2 + P_3 + P_4$ and $Q_d + Q_2 + Q_3$ or $Q_d = Q_2 + Q_3 + Q_4$, see FIG. 13D, with $P_4$ and $Q_4$ used to calculate an offset$_c$ at another corner). In case of FIG. 13D, such summation of non-overlapping vector sums reduces algorithmic complexity. Note that the vectors for $P_3$ and $Q_3$ may also be of length zero, i. e., $P_d = P_2 + P_4$ and $Q_d = Q_2 + Q_4$.

Accordingly, FIGS. 13A to 13D show possible spatial locations of border edge border portions 1011 and corner boundary portions 1024 and corresponding boundary sample vectors P and Q of a coding block 1000. In particular, in FIGS. 13A to 13C the respective border portions 1011, 1024 and the corresponding boundary sample vectors $P_c$, $Q_c$ (at the corners) and $P_d$, $Q_d$ along the edges may not overlap (FIG. 13A), may abut each other (FIG. 13B), may partially overlap (FIG. 13C), or may fully overlap (FIG. 13D) for offset$_c$ and offset$_d$. As an example, the case depicted in FIG. 13A may be used for block dimensions larger than $4N_c$, the cases depicted in FIGS. 13B and 13C may be used for block dimensions between $3N_c$ and $4N_c$, and the case depicted in FIG. 13D may be used for block dimensions smaller than $3N_c$.

Thus, according to an embodiment, the deblocking filter may be configured to set widths of the at least eight border portions 1011, 1012, 1013, 1014, 1021, 1022, 1023, 1024 depending on a size of the block 1000 in generally two different ways. First, if the size of the block 1000 is smaller than a first predetermined amount, e.g. block size<$3N_c$, the four edge border portions 1011, 1012, 1013, 1014 and the four corner border portions 1021, 1022, 1023, 1024 may mutually overlap (see FIGS. 13C and 13D). Second, if the size of the block 1000 is greater than the first predetermined amount, e.g. block size>$3N_c$, the four edge border portions 1011, 1012, 1013, 1014 and the four corner border portions 1021, 1022, 1023, 1024 may not overlap (see FIGS. 13A and 13B).

According to more precise embodiment, the deblocking filter may be configured to set the widths of the at least eight border portions 1011, 1012, 1013, 1014, 1021, 1022, 1023, 1024 depending on a size of the block 1000 in three different ways. First, if the size of the block 1000 is smaller than a first predetermined amount, e.g. block size<$3N_c$, the four edge border portions 1011, 1012, 1013, 1014 and the four corner border portions 1021, 1022, 1023, 1024 may mutually overlap (see FIG. 13D). Second, if the size of the block 1000 is between a first predetermined amount and a second predetermined amount, e.g. $3N_c \leq$ block size $\leq 4N_c$, the four edge border portions 1011, 1012, 1013, 1014 and the four corner border portions 1021, 1022, 1023, 1024 may mutually abut each other (see FIG. 13B). Third, if the size of the block 1000 is greater than the second predetermined amount, e.g. block size>$4N_c$, the four edge border portions 1011, 1012, 1013, 1014 and the four corner border portions 1021, 1022, 1023, 1024 may be mutually spaced apart from each other (see FIG. 13A).

For the cases of FIGS. 13A to 13C, it may be advantageous to modify the prior-art calculation of offset$_d$ as follows:

$$\text{offset}_d = \text{Clip3}(-127, 127, (P_d - Q_d + N_e) >> (\log_2(N_e) + 1)),$$

where $N_e \leq N_d - 2N_c$ is the length of the $P_3$ and $Q_3$ vectors. $N_e$ may be a power of 2 for the >> shift.

Figure 14:
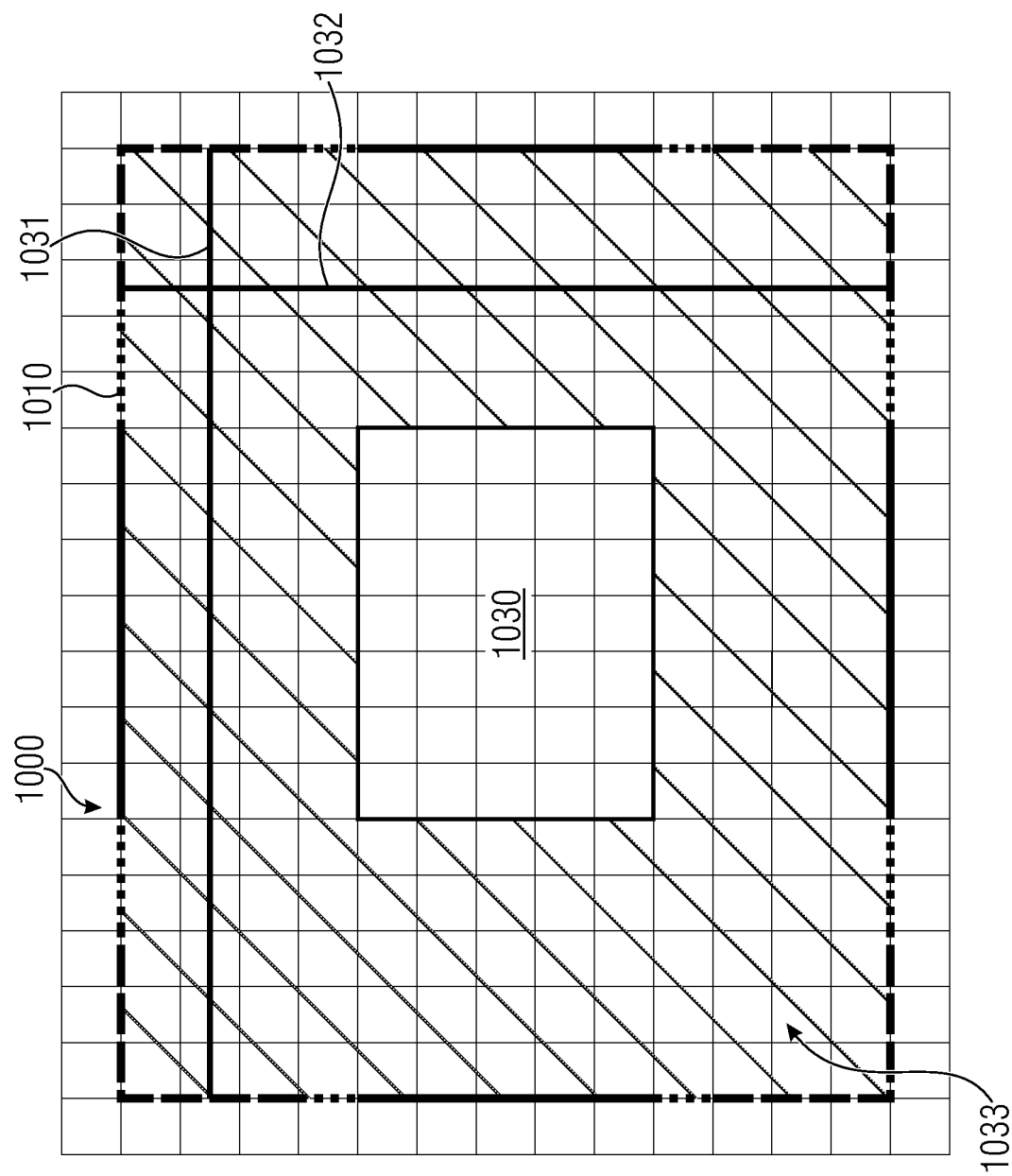
FIG. 14 shows a block comprising a boundary band for applying the deblocking filter according to an embodiment.
Figure 15:
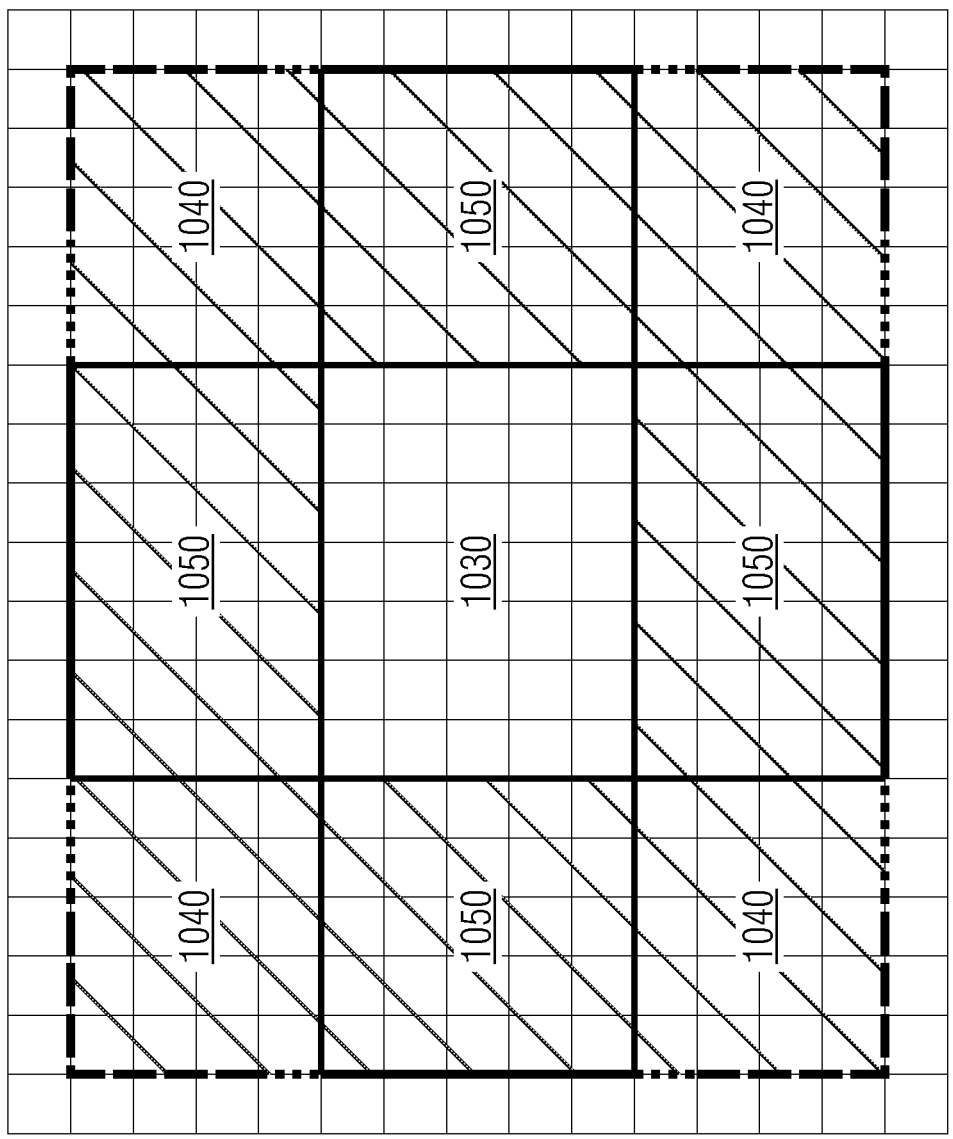
FIG. 15 shows a block being separated into several processing regions according to an embodiment.
Figure 16:
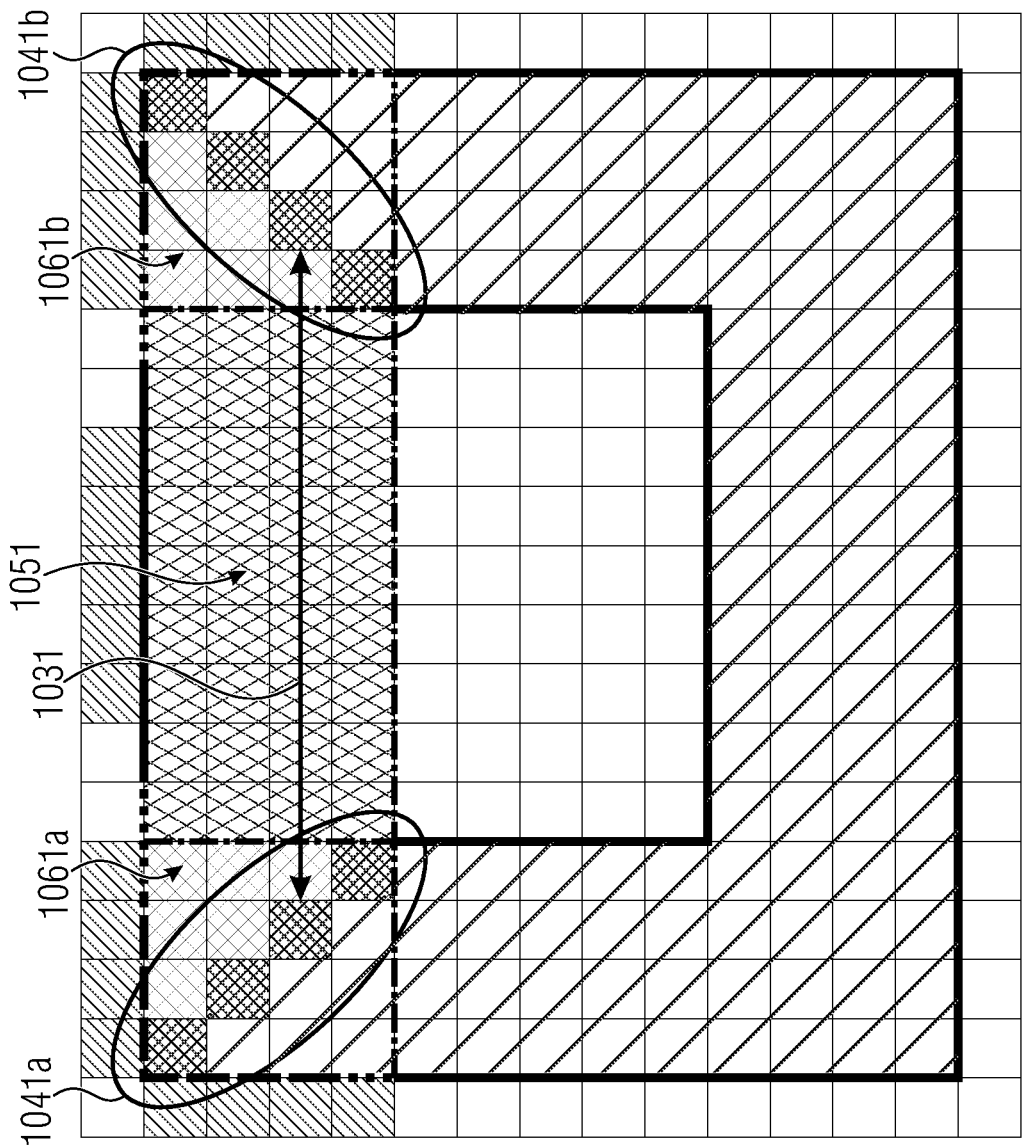
FIG. 16 shows a block comprising several partitioning portions according to an embodiment.

Application of the Eight-Value Deblocking Including Blend-Overs at Block Corners FIGS. 14 to 16 may serve to give a brief introduction in the terminology of the following description. FIG. 14 shows the above discussed block 1000 having a block border 1010 that is partitioned into eight border portions 1011, 1012, 1013, 1014, 1021, 1022, 1023, 1024. Inside the block 1000 rows 1031 and columns 1032 of samples may be arranged.

The depicted row 1031 in FIG. 14 may be the second row when viewed from the block boarder 1010. Accordingly, said row 1031 may have a sample offset of one row relative to the block border 1010. The depicted column 1032 in FIG. 14 may be the third column when viewed from the block boarder 1010. Accordingly, said column 1032 may have a sample offset of two columns relative to the block border 1010. The rows 1031 and columns 1032 may be subsumed as lines of samples.

The deblocking filter may comprise a filter support length which represents the number of lines 1031, 1032 (i.e. rows/columns) of the block 1000 that shall be subject to the filtering process, i.e. the number of lines 1031, 1032 (i.e. rows/columns) of the block 1000 that shall be deblocked on each side of the block border 1010. Said number of lines 1031, 1032 (i.e. rows/columns) are counted from the outside, i.e. from the borderline 1010 to the inside 1030 of the block 1000.

Accordingly, a boundary band 1033 (illustrated in hatched lines) may represent the number of lines 1031, 1032 of samples that shall be deblocked by the deblocking filter, while the bandwidth of said boundary band 1033 may represent the filter strength. The boundary band 1033 may circumferentially extend around the inside 1030 of the block 1000.

In the example depicted in FIG. 14, the boundary band 1033 may comprise a vertical bandwidth of five columns on each vertical portion of the borderline 1010, and a horizontal bandwidth of four rows on each horizontal portion of the borderline 1010. Stated in more general terms, the filter support length, i.e. the bandwidth of the boundary band 1033 may be different between vertical and horizontal portions.

Alternatively, the filter support length, i.e. the bandwidth of the boundary band 1033, may be equal on each border portion 1011, 1012, 1013, 1014, 1021, 1022, 1023, 1024. Thus, according to an embodiment, the deblocking filter may be configured so that the boundary band 1033 comprises a constant circumferential width.

Furthermore, it may be possible that the filter strength, i.e. the bandwidth of the boundary band 1033 may vary with the size of the block 1000 to be coded. For example, the filter strength, i.e. the bandwidth of the boundary band 1033, may increase with increasing size of the block 1000. Thus, according to an embodiment, the deblocking filter may be configured to set a band width of the boundary band 1033 monotonically increasing with respect to a size of the block 1000.

As shown in FIG. 15, the boundary band 1033 may be partitioned into one or more boundary regions 1030, 1040, 1050, which may also be referred to as processing regions. For instance, the boundary band 1033 may comprise corner regions 1040 and edge-centered regions 1050. These boundary regions 1040, 1050 may be square-shaped or generally rectangular. These boundary regions 1040, 1050 may be subject to the deblocking filtering. The boundary band 1033 may further comprise an inner region 1030 that may not be subject to the deblocking filtering.

As shown in FIG. 16, the boundary regions 1040, 1050 may comprise boundary portions. For instance, the corner regions 1040 (exemplarily shown in the top left and top right corner) may comprise corner boundary portions 1041a, 1041b extending diagonally from the respective corner of the block 1000 towards the inside (inner region) 1030 of the block 1000. The exemplarily depicted two corner boundary portions 1041a, 1041b form a pair of neighboring corner boundary portions.

Two or more further boundary portions may be arranged between the pair of neighboring corner boundary portions 1041a, 1041b. For example, a middle boundary portion 1051 may circumferentially extend between the pair of neighboring corner boundary portions 1041a, 1041b. Furthermore, sections 1061a, 1061b may circumferentially extend between the neighboring corner boundary portions 1041a, 1041b and the middle boundary portion 1051. For instance, a first section 1061a may be arranged between the middle boundary portion 1051 and the first corner boundary portion 1041a, and a second section 1061b may be arranged between the middle boundary portion 1051 and the second corner boundary portion 1041b.

Thus, according to an embodiment, the deblocking filter may be configured so that the boundary portions of the boundary band 1033 may at least comprise, at each corner of the block 1000, a corner boundary portion 1041a, 1041b diagonally extending from the respective corner towards an inside 1030 of the block 1000, and between each pair of neighboring corner boundary portions 1041a, 1041b of the block 1000, two or three boundary portions 1051, 1061a, 1061b.

According to a further embodiment, the deblocking filter may be configured so that the two or three boundary portions 1051, 1061a, 1061b between each pair of neighboring corner boundary portions 1041a, 1041b of the block 1000 may comprise a first section 1061a circumferentially neighboring a first corner boundary portion 1041a of the respective pair, a second section 1061b circumferentially neighboring a second corner boundary portion 1041b of the respective pair, and a middle boundary portion 1051 circumferentially between the first and second corner boundary portions of the respective pair.

In some examples, the middle boundary portion 1051 may not be present. This may depend on the block size and on the boundary segmentation of the borderline 1010. In this case, the above described sections 1061a, 1061b may abut each other.

Thus, according to an embodiment, the deblocking filter may be configured to either provide two three boundary portions 1051, 1061a, 1061b or only two boundary portions 1061a, 1061b between each pair of neighboring corner boundary portions 1041a, 1041b. This may depend on the block size which is measured horizontally in this example, i.e. between the two corner boundary portions 1041a, 1041b. Or stated in more general terms, the block size is measured along a direction extending between the corners from which the respective pair of neighboring corner boundary portions 1041a, 1041b extends towards the inside of the block 1000.

In a first case, if the block size is greater than two times a width of the boundary band 1033, then three boundary portions may be arranged between the pair of corner boundary portions 1041a, 1041b, namely a first section 1061a circumferentially neighboring the first corner boundary portion 1041a of the respective pair, a second section 1061b circumferentially neighboring the second corner boundary portion 1041b of the respective pair, and the middle boundary portion 1051 circumferentially extending between the first and second corner boundary portions 1041a, 1041b of the respective pair.

In a second case, if the block size is not greater than two times a width of the boundary band 1033, then the middle boundary portion 1051 may not be present. Accordingly, only two boundary portions may be present, namely the first section 1061a circumferentially neighboring the first corner boundary portion 1041a of the respective pair, and the second section 1061b circumferentially neighboring the second corner boundary portion 1041b of the respective pair. However, in this case the first and second sections 1061a, 1061b abut each other.

Based on the above description, one non-limiting example of a deblocking processing of the deblocking filter being applied to a block (e.g. TU) having middle boundary portions 1051 and corner boundary portions 1041a, 1041b shall be explained in the following.

As mentioned before, the filter characteristics of the deblocking filter may be parametrized based on the dissimilarities between the inner and outer boundary vectors P and Q in corner regions 1040, and in edge-centered regions 1050 if applicable.

Figure 17:
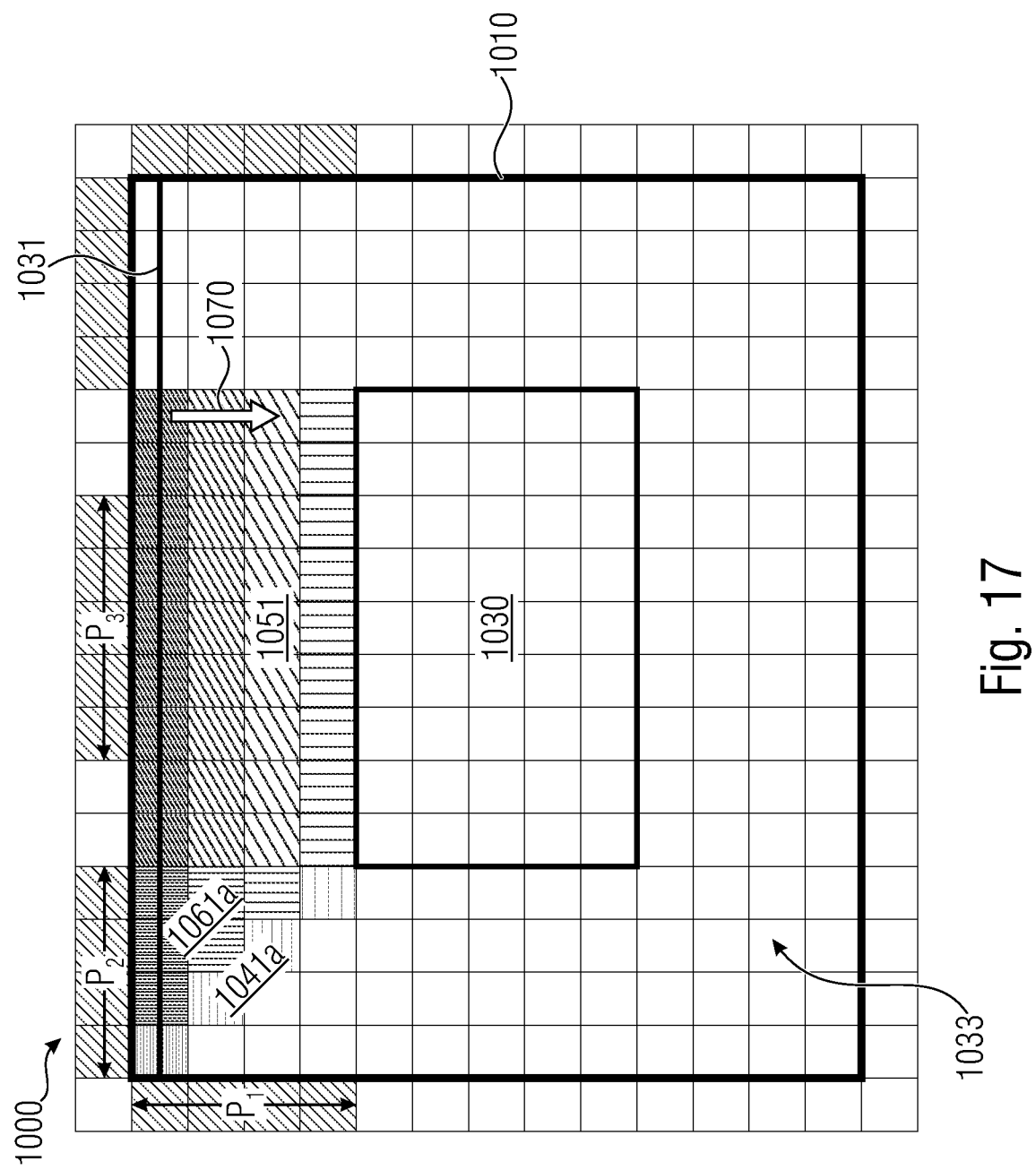
FIG. 17 shows an exemplary application of the deblocking filter onto a block according to an embodiment.

FIG. 17 shows an example of how the deblocking filter may apply the deblocking filtering process to a block 1000.

According to an embodiment, the deblocking filter may be configured to offset each sample within a boundary band 1033 of the block 1000 extending along the block border 1010 by using an offset value (e.g. $offset_c$ for corner regions 1040 and $offset_d$ for edge-centered regions 1050). Said offset value ($offset_c$ and $offset_d$) is set so that the offset value ($offset_c$ and $offset_d$) is constant for each line 1031, 1032 (i.e. row/column) of samples within each boundary portion 1041a, 1041b, 1051, 1061a, 1061b. Or stated in more general terms, constant for each line 1031, 1032 of samples being equally shaped to the block's border 1010 and having a constant sample offset to the block's border 1010.

According to the herein described concept, the filter strength decreases from the borderline 1010 of the block 1000 to the inside 1030 of the block 1000, i.e. in the direction of the arrow 1070. Stated differently, the filter strength is higher for lines 1031, 1032 (i.e. rows/columns) being located nearer to the borderline 1010 of the block 1000 than for lines 1031, 1032 (i.e. rows/columns) being located nearer to the inside 1030 of the block 1000. Accordingly, the offset value ($offset_c$ and $offset_d$) is subject to an attenuation from the border 1010 to a middle 1030 of the block 1000.

Furthermore, the offset value ($offset_c$ and $offset_d$) within the respective boundary portion 1041a, 1041b, 1051, 1061a, 1061b is computed based on the dissimilarity determined for one or more of the border portions 1011, 1012, 1013, 1014, 1021, 1022, 1023, 1024 being circumferentially nearest to the respective boundary portion 1041a, 1041b, 1051, 1061a, 1061b. For example, the offset value $offset_d$ of the samples contained in the edge-centered region 1050, i.e. in the middle boundary portion 1051, is computed based on the dissimilarity between outer vector $P_3$ and inner vector $Q_3$ (not depicted in FIG. 17), while the offset value $offset_c$ of the samples contained in the corner regions 1040, i.e. in the corner boundary portion 1041a and in the sections 1061a, are computed based on the dissimilarity between outer vector $P_c = P_1 + P_2$ and inner vector $Q_c = Q_1 + Q_2$ (not depicted in FIG. 17).

Accordingly, eight offset values may be computed based on the dissimilarities between the inner and outer boundary vectors P and Q, wherein four offset values $offset_d$ for the four edge border portions 1011, 1012, 1013, 1014 and four offset values $offset_c$ for the four corner border portions 1021, 1022, 1023, 1024 are computed. Using the four $offset_c$ and the four $offset_d$ control values determined as described above, an exemplary deblocking process may be constructed as follows.

Figure 18:
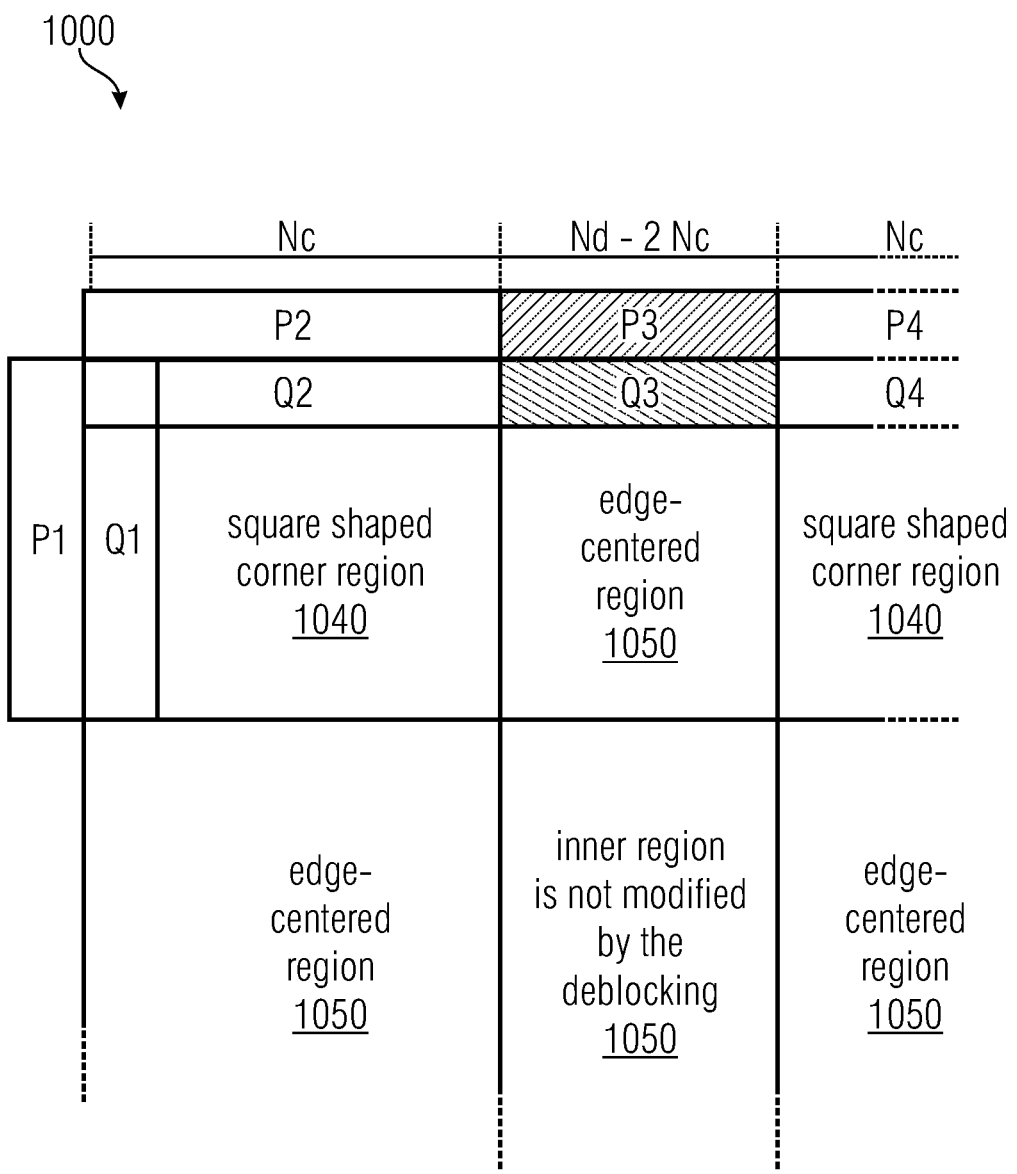
FIG. 18 shows a block, wherein the size of the edge boundary vectors and the size of the corner boundary vectors may depend on the size of the block.

As depicted in FIG. 18, given a coding block 1000 (e.g., TU) of size M×N to be subjected to the deblocking, eight processing regions (i.e. four corner regions 1040 and four edge-centered regions 1050) at the inner block boundaries are defined based on the boundary segmentation of FIGS. 13B and 13D. The square-shaped regions 1040 at the block corners may be of fixed size $N_c \times N_c$ each, while the edge-centered regions 1050 may be of variable size $N_c \times (N_d - 2N_c)$ or $(N_d - 2N_c) \times N_c$ each with, possibly, $N_d - 2N_c = 0$. Furthermore, the pixels inside the inner rectangular region 1030 of the coding block 1000 may not be modified by the deblocking process.

Thus, according to an embodiment, the deblocking filter may be configured so that the edge-centered region 1050 and, thus, the corresponding middle boundary portion 1051 is circumferentially as wide as the block 1000 minus two times the width of the corner regions 1040 and, thus, the corresponding corner boundary portions 10401a, 1041b. Furthermore, if the boundary band 1033 comprises a constant circumferential width, the middle boundary portion 1051 is circumferentially as wide as the block 1000 minus two times the width of the boundary band 1033, since the circumferential width may equal the length of vectors $P_1$, $P_2$, $Q_1$, $Q_2$ in the corner regions 1040.

However, as mentioned above, the edge-centered regions 1050, and thus the middle boundary portions 1051 may not be present at all, depending on the block size. For instance, in blocks of width or height $N_d = 2N_c$, said edge-centered regions 1050 may not be present along the top/bottom or left/right edges, respectively, and, thus, may not be processed. $N_d < 2N_c$ is, however, not allowed.

Still with reference to FIG. 17, which shows the spatial locations of boundary block segments 1030, 1040, 1050 processed by deblocking, it can be seen that the outer $P_1$ to $P_4$ columns/rows of pixel samples are not processed when deblocking the current coding block. Instead they are processed when deblocking adjacent, here left and upper, blocks.

The $Q_1$, $Q_2$, and $Q_4$ line regions are part of their respective corner regions 1040 and $Q_3$ is part of its edge-centered region 1050.

In the following, let $N_c$ be the filter length which, advantageously, equals 16 or 8 pixels and which may depend on the image component (luma or chroma) or block size. The deblocking processing of an edge-centered region 1050 is straightforward. In case of a horizontal top or bottom block border, $N_c$ rows 1031 of pixels p(x, y) are subjected to a weighted addition of $offset_d$:

top row:
p'(x, =p(x, y)=p(x, y)+$o_d$,
bottom row:
p'(x, H−1−y)=p(x, H−1−y)+$o_d$, $o_d$=(offset$_d$·(2$N_c$−1−2y)+ $N_c$)>>(log$_2$($N_c$)+1),
with H being the block height in pixel units, $N_c \leq x < W - N_c$ (W is the block width) and $0 \leq y < N_c$. In case of a vertical left or right block edge center, $N_c$ columns of pixels p(x, y) are treated similarly:

left column:
p'(x, y)=p(x, y)+$o_d$,
right column:
p'(W−1−x, y)=p(W−1−x, y)+$o_d$, $o_d$=(offset$_d$·(2$N_c$−1−2x)+$N_c$)>>(log$_2$ ($N_c$)+1),
with W being the block width in pixel units, $N_c \leq y < H - N_c$ (His again the height) and $0 \leq x < N_c$.

In both cases, the length of each processed row/column 1031, 1032 of pixels equals $N_d - 2N_c$. These operations may be similar to those performed in the prior-art. Effectively, the closer pixel p(x, y) is to the center of the block 1000, the more attenuated offset$_d$ is added. Again, in a block 1000 having width or height $N_2 = 2N_c$, edge-centered regions 1050 will not be present along the affected dimension according to this aspect. The deblocking applied to the corner regions 1040, which is the main concept of this aspect of the invention, is a bit more sophisticated:

diagonal:
p'(f, H−1−f)=p(f, H−1−f)+o$_c$,
p'(W−1−f, f)=p(W−1−f, f)+o$_c$,
p'(W−1−f, H−1−f)=p(W−1−f, H−1−f)+o$_c$,
p'(f, f)=p(f, f)+o$_c$, o$_c$=(((N$_c$−f)·offset$_c$+f·m$_c$)·(2N$_c$−1−2f)+ N$_c^2$)>>(log$_2$ (N$_c^2$)+1), where 0≤f<N$_c$ are the pixel locations along the diagonals toward the block center 1030, and m$_c$ is the arithmetic mean of the two corner-adjacent offset$_d$ values, i. e., ½(offset$_{top}$+offset$_{left}$) or ½(offset$_{top}$+offset$_{right}$) or ½(offset$_{bottom}$+offset$_{left}$) or ½(offset$_{bottom}$+offset$_{right}$). This means that the closer the diagonal pixel p(f, f) or p(W−1−f, f) or p(f, H−1−f) or p(W−1−f, H−1−f) is to the center 1030 of the block 1000, the more m$_c$ dominates the weighted addition and the more attenuated the weighted addition is.

Alternatively, o$_c$ in the deblocking of the corner regions 1040 could be simplified to depend only on offset$_c$ but not on m$_c$, as follows:

$$o_c = (\text{offset}_c \cdot (2N_c - 1 - 2f) + N_c) >> (\log_2(N_c) + 1).$$

This yields very similar subjective quality. The remaining two corner sections are given by horizontal:
p'(x, f)=p(x, f)+((((N$_c$−x)·offset$_c$+x·offset$_d$)·(2N$_c$−1−2f)+ N$_c^2$)>>(log$_2$ (N$_c^2$)+1)),
with f<x<N$_c$,
vertical parts:
p'(f, y)=p(f, y)+((((N$_c$−y)·offset$_c$+y·offset$_d$)·(2N$_c$−1−2f)+ N$_c^2$)>>(log$_2$ (N$_c^2$)+1))
with f<y<N$_c$, for the c=top-left block corner 1040 as an example. The other three corners are processed equivalently. In other words, the last two equations represent a special, hardware-friendly realization of a linear interpolation between adjacent weighted offset$_c$ and offset$_d$ values. It may be noted that in all equations of the preceding 14 pages, log$_2$ (N)+1= log$_2$ (2N) and log$_2$ (N$^2$)+1=2 log$_2$ (N)+1, thus particular implementations may vary in detail.

Stated in terms of the appended claims, according to an embodiment, the deblocking filter may be configured to set, for each of the corner boundary portions 1041, the offset value o$_c$ for samples within the respective corner boundary portion 1041 so that the offset value o$_c$ of the samples within the respective corner boundary portion 1041 varies from the border 1010 of the block 1000 towards the inside of the block 1000 according to a weighted average.

Said weighted average is an average over a first offset value offset$_c$ for the corner border portions 1021 and a second offset value m$_c$ for the two corner-adjacent edge border portions 1011, 1014 (see also FIG. 10). In more general terms, the first offset value offset$_c$ may be determined based on the dissimilarity determined for the respective corner border portion 1021, 1022, 1023, 1024 from which the respective corner boundary portion 1041 diagonally extends towards the inside 1030 of the block 1000, while the second offset value m$_c$ may be determined based on the dissimilarities determined for the edge border portions 1011, 1012, 1013, 1014 circumferentially adjacent to the respective corner border portion 1021, 1022, 1023, 1024 from which the respective corner boundary portion 1041 diagonally extends towards the inside 1030 of the block 1000.

The weights (see N$_c$−f and f in the formula above) of the weighted average may depend on the samples' distance f from the border 1010 of the block 1000 in a manner so that the weighted average depends monotonically decreasingly less on the first offset value offset$_c$ compared to the second offset value m$_c$ at increasing distance. In other words, the closer the diagonal pixel p(f, f) or p(W−1−f, 1) or p(f, H−1−f) or p(W−1−f, H−1−f) is to the center 1030 of the block 1000, the more m$_c$ dominates the weighted addition and the more attenuated the weighted addition is.

Referring back again to FIG. 16, the corner boundary portions 1041a, 1041b may diagonally extend from the corner of the block 1000 to the inside 1030 of the block. A first and a second section 1061a, 1061b may be arranged between a middle boundary portion 1051, as explained above.

Offset values for samples contained in the first section 1061a may be interpolated between the first corner boundary portion 1041a and the middle boundary portion 1051. In particular, when viewed along a row 1031, an offset value for a sample contained in the first section 1061a may be interpolated between an offset value of the first corner boundary portion 1041a (in the same row 1031) and an offset value of the middle boundary portion 1051 (in the same row 1031).

Offset values for samples contained in the second section 1061b may be interpolated between the second corner boundary portion 1041b and the middle boundary portion 1051. In particular, when viewed along a row 1031, an offset value of a sample contained in the second section 1061b may be interpolated between an offset value of the second corner boundary portion 1041b (in the same row 1031) and an offset value of the middle boundary portion 1051 (in the same row 1031).

Stated in terms of the appended claims, according to an embodiment, the deblocking filter is configured to set, for the first section 1061a, the offset value for samples within the first section 1061a so that for each line (i.e. row/column) 1031, 1032, the offset value of samples within the respective line (i.e. row/column) 1031, 1032 is interpolated between the offset value of the first corner boundary portion 1041a in the respective line (i.e. row/column) 1031, 1032 and the offset value of the middle boundary portion 1051 in the respective line (i.e. row/column) 1031, 1032. Furthermore, the deblocking filter is configured to set, for the second section 1061b, the offset value for samples within the second section 1061b so that for each line (i.e. row/column) 1031, 1032, the offset value of samples within the respective line (i.e. row/column) 1031, 1032 is interpolated between the offset value of the second corner boundary portion 1041b in the respective line (i.e. row/column) 1031, 1032 and the offset value of the middle boundary portion 1051 in the respective line (i.e. row/column) 1031, 1032.

FIG. 19 shows a schematic block diagram of a method for filtering a block 1000 of a block-based coded picture 12.

In block 1901, for each of at least eight border portions 1011, 1012, 1013, 1014, 1021, 1022, 1023, 1024 of a border 1010 of the block 1000, a dissimilarity between an unfiltered content 1015 of the block 1000 and a surrounding picture content 1016 around the block 1000 along the respective border portion 1011, 1012, 1013, 1014, 1021, 1022, 1023, 1024 is determined, wherein the eight border portions 1011,

1012, 1013, 1014, 1021, 1022, 1023, 1024 include four corner border portions 1021, 1022, 1023, 1024, each arranged at a corner of the block 1000, and four edge border portions 1011, 1012, 1013, 1014, each arranged at intermediary portions of the border 1010 between the corners of the block 1000.

In block 1902 a deblocking filtering of the block 1000 is parametrized using the dissimilarities determined for the at least eight border portions 1011, 1012, 1013, 1014, 1021, 1022, 1023, 1024 in order to obtain a filtered content of the block 1000.

Note that, unlike prior-art filters like, e.g., those in HEVC, the inventive "superstrong" deblocking algorithm may not adapt its deblocking strength depending on the pixel samples to be deblocked and, thus, exhibits lower computational complexity than the conventional technology during the filter application. Of course, a deblocking strength adaptation can be achieved by means of the first aspect of the present invention, i.e., by a usage of a conditionally signaled filter control parameter allowing to select, in both the encoder and decoder, a deblocking process from a prior-art "weak" or "medium-strong" algorithm and the herein described "superstrong" algorithm. Note, furthermore, that in FIG. 13A not all pixel samples along a block boundary are considered in the calculation of the $offset_c$ and $offset_d$ control values. This represents an algorithmic complexity reduction compared with the state of the art during the filter calculation. To conclude, it can be summarized that the inventive very strong corrective deblocking approach presented in the second aspect of the invention attains better visual performance than the conventional technology while, at the same time, exhibiting lower computational complexity in both the calculation and application of the corrective deblocking algorithm.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder for block-based decoding of picture data using a deblocking or deringing filter, configured to
   reconstruct, in a blockwise manner, a picture from a data stream using prediction and using a prediction residual coded in the data stream to acquire a reconstructed version of the picture,
apply the deblocking or deringing filter to the reconstructed version of the picture, and
locally vary a filter strength of the deblocking or deringing filter depending on a first measure locally measuring a mean block size, and a second measure locally measuring a frequency of non-zero coding of the prediction residual,
wherein the decoder is configured to perform the step of locally varying the filter strength by
for first portions of the picture, where the first and second measures fulfill a predetermined criterion,
reading a filter control parameter from the data stream, said filter control parameter indicating a first filter strength of the deblocking or deringing filter to be applied at the respective portion, and
for second portions of the picture, where the first and second measures do not fulfill the predetermined criterion,
omit reading a filter control parameter from the data stream and setting a strength of the deblocking or deringing filter to be applied at the respective portion to a lower second filter strength.

2. The decoder according to claim 1, configured to partition the picture into blocks, and
perform the reconstruction of the picture using the blocks,
wherein the first measure is adapted to locally measure a size of the blocks.

3. The decoder according to claim 2, configured to, in the reconstruction of the picture,
assign to each block one of a plurality of prediction modes to the respective block, the
plurality of prediction modes comprising one or more intra-prediction modes and/or one or more inter prediction modes.

4. The decoder according to claim 2, configured to perform the partitioning of the picture into blocks by subjecting each of a plurality of tree root blocks into which the picture is pre-partitioned to recursive multi-tree sub-divisioning so that the blocks form leaf blocks of the plurality of tree-root blocks, and
determine the first measure and the second measure locally for each tree root block.

5. The decoder according to claim 4, configured to read partitioning information from the data stream,
perform the subjecting of each of the plurality of tree root blocks to the recursive multitree sub-divisioning depending on the partitioning information, and
determine the first measure depending on the partitioning information.

6. The decoder according to claim 4, configured to
determine the first measure by determining, for each tree root block, the number of leaf blocks into which the respective tree root block is split.

7. The decoder according to claim 4, configured to
decode the prediction residual from the data stream in units of coefficient blocks representing a piecewise transformation of the prediction residual with at least one coefficient block per block, and
determine the second measure by determining, for each tree root block, the number of coefficient blocks being not fully quantized to zero.

8. The decoder according to claim 7, configured to, for each coefficient block,
select one of a plurality of inverse transformations, optionally comprising an identity transformation, and use the selected inverse transformation to acquire a corresponding block or a sub-block thereof.

9. The decoder according to claim 1, wherein the predetermined criterion is fulfilled
if the first measure falls below a first predetermined threshold, and
if the second measure exceeds or is equal to a second predetermined threshold.

10. The decoder according to claim 9, wherein
the first predetermined threshold is p with p fulfilling $1<p<17$ for each of the tree root blocks, and/or
the second predetermined threshold is q with q fulfilling $-1<q<51$ for each of the tree root blocks.

11. The decoder according to claim 1,
wherein the first and second portions are tree root blocks into which the picture is prepartitioned
and which are further subject to multi-tree sub-divisioning to result into blocks using which the reconstruction is performed.

12. The decoder according to claim 1,
wherein the picture data comprises a video and the decoder is a video decoder, an in-loop filter of which is formed by the deblocking or deringing filter.

13. An encoder for block-based encoding of picture data using a deblocking or deringing filter as an in-loop filter, configured to
encode, in a blockwise manner, a picture into a data stream by using prediction and by coding a prediction residual into the data stream with providing a reconstructed version of the picture in a prediction loop of the encoder,
apply the deblocking or deringing filter onto the reconstructed version of the picture, and
locally vary a filter strength of the deblocking or deringing filter depending on a first
measure locally measuring a mean block size, and a second measure locally measuring frequency of non-zero coding of the prediction residual,
wherein the encoder is configured to perform the step of locally varying the filter strength by
for first portions of the picture, where the first and second measures fulfill a predetermined criterion,
inserting a filter control parameter into the data stream, said filter control parameter for indicating a first filter strength of the deblocking or deringing filter to be applied at the respective portion,
and
for second portions of the picture, where the first and second measures do not fulfill the predetermined criterion,
refrain from inserting a filter control parameter into the data stream and setting a strength of the deblocking or deringing filter to be applied at the respective portion to a lower second filter strength.

14. The encoder according to claim 13, configured to
partition the picture into blocks, and
perform the encoding using the blocks,
wherein the first measure is adapted to locally measure a size of the blocks.

15. The encoder according to claim 14, configured to, in the encoding,
assign to each block one of a plurality of prediction modes to the respective block, the
plurality of prediction modes comprising one or more intra-prediction modes and/or one or more
inter prediction modes.

16. The encoder according to claim 14, configured to
perform the partitioning by subjecting each of a plurality of tree root blocks into which the picture is prepartitioned
to recursive multi-tree sub-di visioning so that the blocks form leaf blocks of the plurality of tree-root blocks, and
determine the first measure and the second measure locally for each tree root block.

17. The encoder according to claim 16, configured to
perform the subjecting of each of the plurality of tree root blocks to the recursive multi-tree sub-divisioning based on partitioning information,
insert the partitioning information into the data stream, and
determine the first measure depending on the partitioning information.

18. The encoder according to claim 16, configured to
determine the first measure by determining, for each tree root block, the number of leaf blocks into which the respective tree root block is split.

19. The encoder according to claim 16, configured to
encode the prediction residual into the data stream in units of coefficient blocks
representing a piecewise transformation of the prediction residual with at least one coefficient block per block, and
determine the second measure by determining, for each tree root block, the number of coefficient blocks being not fully quantized to zero.

20. The encoder according to claim 19, configured to, for each coefficient block,
select one of a plurality of transformations, optionally comprising an identity
transformation, and use the selected inverse transformation to acquire a corresponding block or a sub-block thereof.

21. The encoder according to claim 13,
wherein the predetermined criterion is fulfilled
if the first measure falls below a first predetermined threshold, and
if the second measure exceeds or is equal to a second predetermined threshold.

22. The encoder according to claim 21, wherein
the first predetermined threshold is p with p fulfilling $1<p<17$ for each of the tree root blocks, and/or
the second predetermined threshold is q with q fulfilling $-1<q<51$ for each of the tree root blocks.

23. The encoder according to claim 13,
wherein the first and second portions are tree root blocks into which the picture is prepartitioned
and which are further subject to multi-tree sub-divisioning to result into blocks using which the encoding is performed.

24. A method for block-based decoding of picture data using a deblocking or deringing filter, the method comprising the steps of
reconstructing, in a blockwise manner, a picture from a data stream using prediction and using a prediction residual coded in the data stream to acquire a reconstructed version of the picture,
applying the deblocking or deringing filter to the reconstructed version of the picture, and
locally varying a filter strength of the deblocking or deringing filter depending on a first measure locally measuring a mean block size, and a second measure locally measuring a frequency of non-zero coding of the prediction residual,
wherein the step of locally varying the filter strength is performed by
for first portions of the picture, where the first and second measures fulfill a predetermined criterion,
reading a filter control parameter from the data stream, said filter control parameter indicating a first filter strength of the deblocking or deringing filter to be applied at the respective portion, and
for second portions of the picture, where the first and second measures do not fulfill the predetermined criterion,
refrain from reading a filter control parameter from the data stream and setting a strength of the deblocking or deringing filter to be applied at the respective portion to a lower second filter strength.

25. A method for block-based encoding of picture data using a deblocking or deringing filter as an in-loop filter, the method comprising the steps of encoding, in a blockwise manner, a picture into a data stream using prediction and by coding a prediction residual into the data stream with providing a reconstructed version of the picture in a prediction loop,
applying the deblocking or deringing filter onto the reconstructed version of the picture, and
locally varying a filter strength of the deblocking or deringing filter depending on a first measure locally measuring a mean block size and a second measure locally measuring a frequency of non-zero coding of the prediction residual,
wherein the step of locally varying the filter strength is performed by
for first portions of the picture, where the first and second measures fulfill a predetermined criterion,
inserting a filter control parameter into the data stream, said filter control parameter for indicating a first filter strength of the deblocking or deringing filter to be applied at the respective portion, and
for second portions of the picture, where the first and second measures do not fulfill the predetermined criterion,
refrain from inserting a filter control parameter into the data stream and setting a strength of the deblocking or deringing filter to be applied at the respective portion to a lower second filter strength.

26. A non-transitory digital storage medium having a computer program stored thereon to perform a method for block-based decoding of picture data using a deblocking or deringing filter, the method comprising the steps of reconstructing, in a blockwise manner, a picture from a data stream using prediction and using a prediction residual coded in the data stream to acquire a reconstructed version of the picture,
applying the deblocking or deringing filter to the reconstructed version of the picture, and
locally varying a filter strength of the deblocking or deringing filter depending on a first measure locally measuring a mean block size, and a second measure locally measuring a frequency of non-zero coding of the prediction residual,
wherein the step of locally varying the filter strength is performed by
for first portions of the picture, where the first and second measures fulfill a predetermined criterion,
reading a filter control parameter from the data stream, said filter control parameter indicating a first filter strength of the deblocking or deringing filter to be applied at the respective portion, and for second portions of the picture, where the first and second measures do not fulfill the predetermined criterion, refrain from reading a filter control parameter from the data stream and setting a strength of the deblocking or deringing filter to be applied at the respective portion to a lower second filter strength, when said computer program is run by a computer.

27. A non-transitory digital storage medium having a computer program stored thereon to perform a method for block-based encoding of picture data using a deblocking or deringing filter as an in-loop filter, the method comprising the steps of encoding, in a blockwise manner, a picture into a data stream by using prediction and by coding a prediction residual into the data stream with providing a reconstructed version of the picture in a prediction loop, applying the deblocking or deringing filter onto the reconstructed version of the picture, and locally varying a filter strength of the deblocking or deringing filter depending on a first measure locally measuring a mean block size and a second measure locally measuring a frequency of non-zero coding of the prediction residual, wherein the step of locally varying the filter strength is performed by for first portions of the picture, where the first and second measures fulfill a predetermined criterion, inserting a filter control parameter into the data stream, said filter control parameter for indicating a first filter strength of the deblocking or deringing filter to be applied at the respective portion, and for second portions of the picture, where the first and second measures do not fulfill the predetermined criterion, refrain from inserting a filter control parameter into the data stream and setting a strength of the deblocking or deringing filter to be applied at the respective portion to a lower second filter strength when said computer program is run by a computer.

\* \* \* \* \*